United States Patent
Hybertson

(10) Patent No.: US 9,154,835 B2
(45) Date of Patent: Oct. 6, 2015

(54) METHODS AND APPARATUS FOR DVR AND NETWORK STORAGE OF LOCALLY RECORDED CONTENT

(71) Applicant: Eric D Hybertson, Longmont, CO (US)

(72) Inventor: Eric D Hybertson, Longmont, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 35 days.

(21) Appl. No.: 13/800,712

(22) Filed: Mar. 13, 2013

(65) Prior Publication Data

US 2014/0270713 A1 Sep. 18, 2014

(51) Int. Cl.
- *H04N 5/76* (2006.01)
- *H04N 21/4405* (2011.01)
- *H04N 5/765* (2006.01)
- *H04N 21/41* (2011.01)
- *H04N 21/433* (2011.01)
- *H04N 21/4335* (2011.01)
- *H04N 21/436* (2011.01)
- *H04N 21/442* (2011.01)

(52) U.S. Cl.
CPC ........... *H04N 21/4405* (2013.01); *H04N 5/765* (2013.01); *H04N 21/4135* (2013.01); *H04N 21/4334* (2013.01); *H04N 21/4335* (2013.01); *H04N 21/43615* (2013.01); *H04N 21/44227* (2013.01)

(58) Field of Classification Search
CPC .. G11B 2220/412; G11B 27/105; H04N 5/85; H04N 21/2747; H04N 21/47214; H04N 21/4147; H04N 21/44204
See application file for complete search history.

(56) References Cited

U.S. PATENT DOCUMENTS

| | | | | |
|---|---|---|---|---|
| 2012/0066089 A1* | 3/2012 | Henderson | ................. | 705/26.25 |
| 2012/0131125 A1* | 5/2012 | Seidel et al. | ................. | 709/212 |

* cited by examiner

*Primary Examiner* — Huy T Nguyen
(74) *Attorney, Agent, or Firm* — Michael P. Straub; Ronald P. Straub; Abbas Zaidi

(57) ABSTRACT

Methods and apparatus for expanding the storage capacity of one or more DVRs in a household by attaching them to a shared network storage device are described. Recorded content is encrypted in at least some embodiments on a per customer basis rather than on a per DVR basis allowing content to be moved between devices at a customer premise and played back by any of the devices at the customer premise where the content was recorded. Network congestion delays are avoided by allowing a user to specify when content is to be locally available at a DVR and moving the content prior to the specified time, if necessary, to the local storage device in the DVR. DVRs can access, decrypt and display content stored on the network storage device that was recorded by another DVR in the same household.

18 Claims, 11 Drawing Sheets

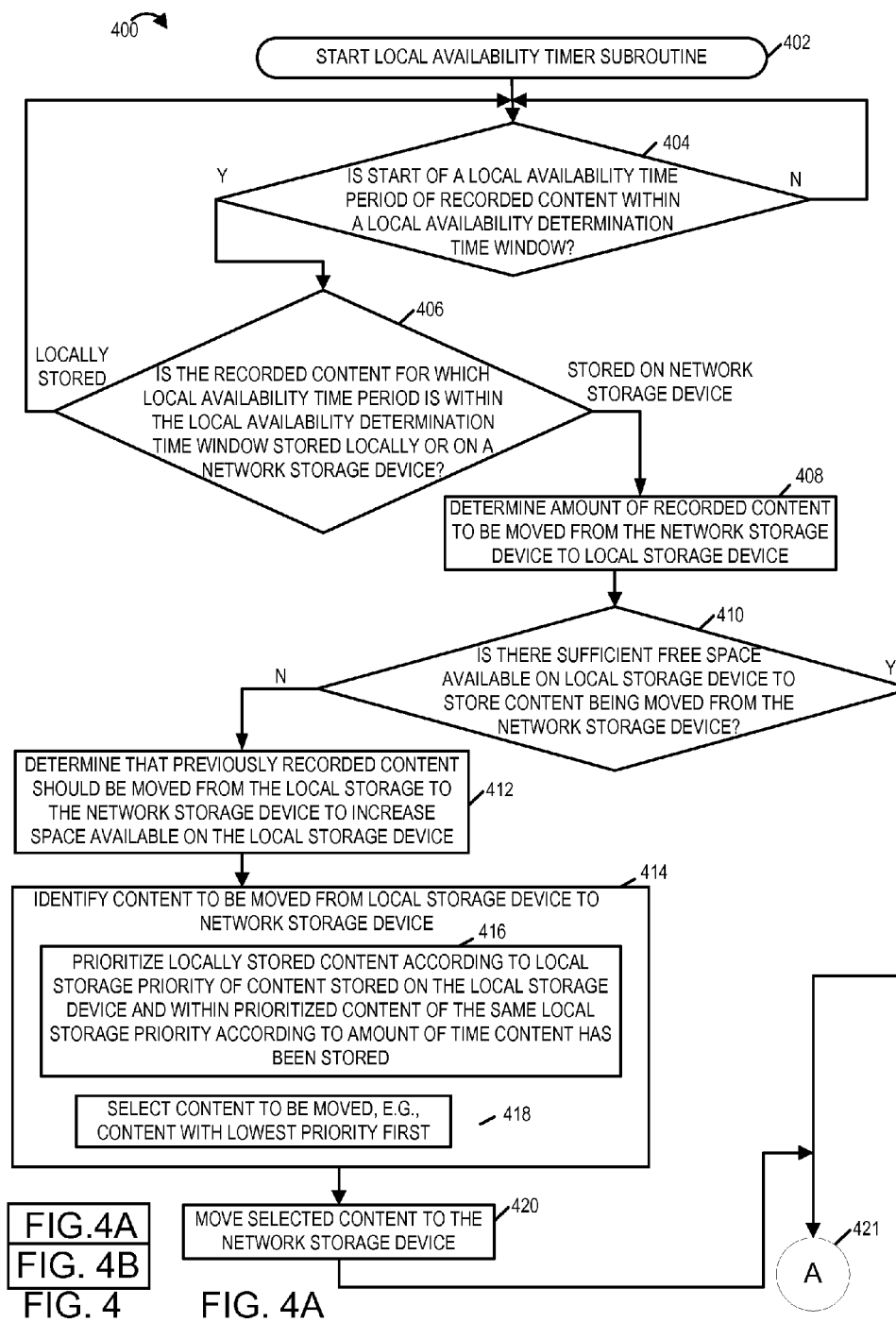

| | CONTENT IDENTIFICATION INFORMATION, E.G., PROGRAM ID, TITLE ETC. ↓ 602 | LOCAL STORAGE PRIORITY (0 TO 3) ↓ 604 | DESIRED LOCAL AVAILABILITY TIME PERIOD ↓ 606 | RECORDING TIMER TYPE, E.G., SINGLE EVENT TIMER OR RECURRING TIMER ↓ 608 |
|---|---|---|---|---|
| 610 → | GREY'S ANATOMY, SEASON 9 | 1 | FRIDAY 8:30PM-12:00AM | R |
| 612 → | SKYFALL | 3 | --- | S |
| | ⋮ | ⋮ | ⋮ | ⋮ |
| 620 → | OFFICE | 0 | SAT 1:00PM-4:00PM | R |

600 ↘

SET OF RECORDING TIMER RECORDS

FIG. 6

| CONTENT IDENTIFICATION INFORMATION, E.G., PROGRAM ID, TITLE ETC. (702) | CHANNEL INFORMATION (704) | RECORD DAY AND/OR DATE (706) | RECORD START TIME (708) | RECORD END TIME (710) | ESTIMATED AMOUNT OF DATA (712) |
|---|---|---|---|---|---|
| GREY'S ANATOMY, SEASON 9 | 101 | FRI 2/1/13 | 9:00PM | 10:00PM | 0.25 GB |
| SKYFALL | 104 | SAT 2/2/13 | 7:30PM | 10:00PM | 0.6 GB |
| ⋮ | ⋮ | ⋮ | ⋮ | ⋮ | ⋮ |
| OFFICE | 152 | FRI 2/1/13 | 8:30PM | 9:00PM | 0.15 GB |

SET OF RECORDING SCHEDULES

| | 802 | 804 | 806 | 808 | 810 |
|---|---|---|---|---|---|
| | RECORDED CONTENT IDENTIFICATION INFORMATION, E.G., PROGRAM ID, TITLE ETC. | LOCATION, E.G., LOCAL STORAGE DEVICE OR NETWORK STORAGE DEVICE | LOCAL STORAGE PRIORITY (0 TO 3) | DESIRED LOCAL AVAILABILITY TIME PERIOD | AMOUNT OF DATA |
| 820 | GREY'S ANATOMY, SEASON 9 | LOCAL | 1 | FRIDAY 8:30PM-12:00AM | 0.25 GB |
| 822 | SKYFALL | LOCAL | 3 | --- | 0.6 GB |
| 850 ⋮ | ⋮ | ⋮ | ⋮ | ⋮ | ⋮ |
| 830 | OFFICE | NAS | 0 | SAT 1:00PM-4:00PM | 0.15 GB |
| 831 | BATMAN FOREVER | NAS | 0 | --- | 0.5 GB |
| 852 { 832 | TRANSFORMERS | NAS | 0 | --- | 0.6 GB |
| 840 | LOST, SEASON 4 FINALE | NAS | 0 | --- | 0.35 GB |

SET OF RECORDING RECORDS

FIG. 8

METHODS AND APPARATUS FOR DVR AND NETWORK STORAGE OF LOCALLY RECORDED CONTENT

FIELD

The present invention relates to methods and apparatus for recording, storing and/or distributing content, e.g., video and/or audio content, at a customer premise, e.g., in a secure manner.

BACKGROUND

Currently, digital video records (DVRs) have a finite amount of storage for video. Over time, users tend to expect ever increasing amounts of storage and, after a few years or even a shorter time period can easily become frustrated with the amount of storage included in their DVR. Thus, DVR users are often confronted with a desire to upgrade or replace their DVR because of storage limitations.

Upgrading or replacing of a DVR presents cable companies and/or other providers of such equipment significant cost and logistical problems. Replacing a DVR simply because of storage constraints can be costly and wasteful since the tuner and/or other circuitry of the DVR often remains fully functional and can remain usable for many years beyond the point where a user becomes unsatisfied with the original storage capacity of the device.

Replacing of drives in DVRs can be time consuming and present problems in terms of the transfer of existing stored content. Many users of a DVR would like to keep the content they already have stored on the DVR requiring the transfer of the data as part of a DVR upgrade. This can take time and effort which can be costly from the perspective of a cable company or other supplier of DVRs on a lease or rental basis.

While at first it might seem that connecting DVRs to one another via a network might provide the DVRs the opportunity to use one another's storage devices, this is often not a practical solution since most DVRs encrypt the content they record on their local drives in a manner that makes it unusable to another DVR. While this is done for security reasons, it makes sharing of local storage devices among networked DVRs difficult or impractical in many cases.

Previous attempts to address storage problems have involved the use of external drives attached to a DVR to supplement the DVRs original storage with the data on the drive being encrypted in a manner specific to the DVR to which the drive is coupled. Customers find the use of external drives unsightly and cumbersome. Accordingly, while supporting the use of external drives might seem like an easy solution to limited local DVR problems, it is not practical for many applications due to consumer unhappiness with such an approach.

Rather than attempt to increase the local storage capacity of a DVR, one approach to home video recording and playback relies on a single centralized storage device being shared by multiple playback devices. In such implementations, the content is normally streamed and not stored for any significant amount of time on a playback device. While this approach allows for a single relatively large network storage device to be shared by multiple playback devices this approach also suffers from various network related disadvantages.

Since content is streamed over what is often a shared home network, the playback may be subject to network congestion issues. The home network used to communicate the streamed content, e.g., a wireless home network or wired home network, may not be able to provide the bandwidth required to stream multiple video programs simultaneously to all the video playback devices. This can result in playback delays, e.g., as a playback device must wait for its buffer to fill with sufficient content to begin playback of a program segment.

In view of the above discussion it should be appreciated that there is a need for improved methods and apparatus which can be used to record, store and playback content at a customer premise, e.g., home or business. It would be desirable if, at least in some embodiments, a DVR device need not be limited to its internal storage capacity. It would also be desirable if methods and/or apparatus could be developed to avoid or overcome at least some of the disadvantages of using a network based storage device relating to potential network communication delays and/or network congestion. While not critical it would be also desirable if content recorded and encrypted by one DVR on a home network at a customer premise could be decoded and displayed by another DVR on the home at the same customer premise but still being secure with respect to devices which are not part of the home network or which are outside the customer premise where the DVR is located.

SUMMARY

Methods and apparatus are described which allow multiple DVRs in a customer premise to take advantage of both local storage and a network storage device without subjecting a user to many of the drawbacks related to the use of a network storage device which streams content at playback time to the playback device.

In accordance with various features a network storage device is used to store content recorded by DVRs attached to the network storage device by a local network, e.g., home network. Content is stored on the network storage device on a per asset, e.g., per program or per recording, basis. By allowing DVRs to store one or more programs on the network storage device, the DVRs are not limited by their local storage capacity.

To avoid potential drawbacks and delays associated with transferring content from the network storage device to the DVR at playback time, a user can specify a desired time for a particular program or piece of content to be locally available, e.g., on the DVR which originally recorded the content.

Content stored on the network drive is transferred in sufficient time before the time it is to be locally available to potential network congestion issues.

In accordance with one feature a user can indicate a local storage priority for content to be recorded. The local storage priority information is used to determine which content will be transferred to the network storage device in the event local storage capacity is insufficient to record content to be scheduled to be recorded. Prior to recording of content, a determination is made as to whether or not content needs to be transferred to the network storage device to make adequate space available for recording of content schedule to be recorded. Content with the lowest local availability priority will be moved to the network storage device as required to allow scheduled recordings to proceed.

Content transfer transferred between the DVR and network storage device is initiated prior to a scheduled recording or prior to the time content is scheduled to be locally available. The amount of time prior to a scheduled recording or prior to the time content is scheduled to be locally available, when content transfer between the DVR and network storage device is initiated, depends in some embodiments on past experience with regard to local network congestion with the content being moved in time to avoid the content transfer causing network congestion problems.

In some embodiments, to allow content recorded by one device to be played back by another device on the home network, rather than using a DVR specific encryption scheme for the content, the DVRs on the home network share encoding and decoding encryption keys with the keys being assigned on a per customer basis by a security service coupled to the home network by a communications service such as a cable network. The security server may be in a cable network headend and may be responsible for providing security keys used for encrypting content on a per customer premise basis, e.g., with DVRs on a customer premise being provided encryption and decryption keys which allow for the DVRs at the customer premise to encode content and decode content in a manner that allows an individual DVR at the customer premise to decode content recorded and encoded by another DVR at the customer premise. In at least some such embodiments, any DVR coupled to the network storage device can receive, decrypt and output content stored on the network storage device by another DVR located at the customer premise location.

Thus, at least in some embodiments, through the use of a combination of local and network storage, combined with timely moving of content between the local and network storage devices, many of the limitations associated with a limited local disk can be overcome or avoided without the disadvantages that are often associated with multiple devices sharing a local network that may suffer from congestion problems during periods of time.

It should be appreciated that the methods and apparatus described herein address the problem of finite storage on a DVR by offering one or more network attached storage (NAS) devices as a storage expansion option. By securing content on a customer, e.g., user, basis, rather than a per DVR basis, a customer can use and share content recorded on one DVR at a customer premise with another DVR at the customer premise.

The methods described herein allow content recorded by a DVR to be secured on a per customer/household basis, allowing unrestricted movement of each asset, e.g., recorded program, within that subscriber's home whether the movement is between a NAS and a DVR which recorded the content, between DVRs in the home or between the NAS and a DVR which did not original record the content stored on the NAS.

While various exemplary embodiments and features have been described, numerous additional features and embodiments are described in the detailed description which follows.

BRIEF DESCRIPTION OF THE FIGURES

FIG. 6 illustrates an exemplary set of recording timer records, in accordance with some embodiments of the invention.

FIG. 7 illustrates an exemplary set of recording schedules generated in accordance with some embodiments of the invention.

FIG. 8 illustrates an exemplary set of recording records generated in accordance with some embodiments of the invention.

DETAILED DESCRIPTION

Figure 1:
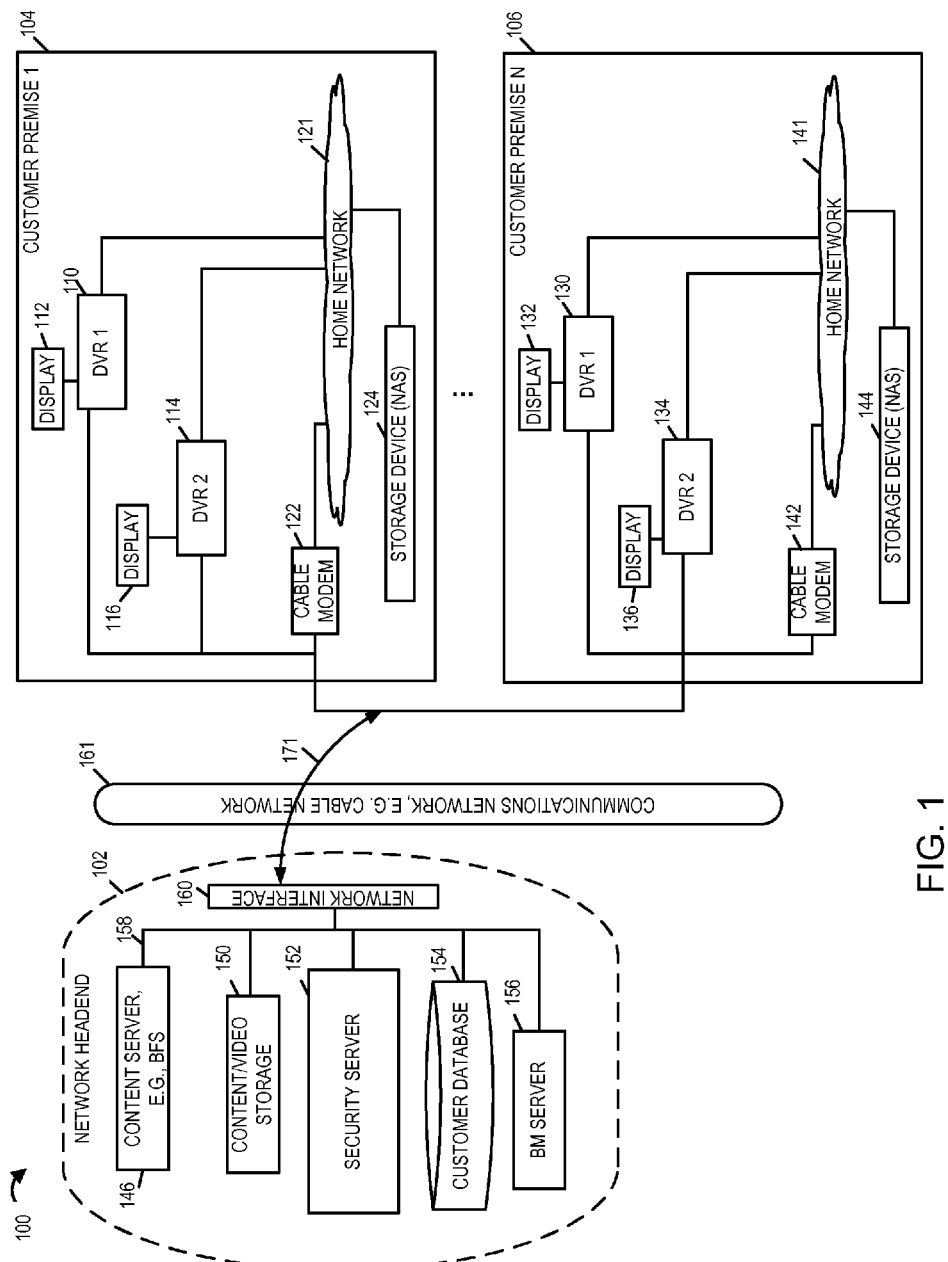
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content and/or other information, e.g., security licenses, encryption/decryption keys, program guide information etc., to customer premise equipments (CPEs) including content playback devices in accordance with various embodiments of the invention. The system 100 includes a network headend 102, a cable network 161, e.g., a hybrid fiber-coaxial (HFC) network and/or internet, and a plurality of customer premises 104, 106. In various embodiments the content, e.g., multimedia content, is delivered from the headend 102 over the cable network 161 to one or more devices in the customer premise 104, 106. As will discussed, in some embodiments, the content playback devices at the customer premises are IP (internet protocol) capable, that is, they support communications over IP.

The network headend 102 may be implemented at a cable network office or hubsite serving a plurality of customer premises and includes multiple servers and databases which are coupled together as shown. In the FIG. 1 example, the headend 102 includes a content server 146, a content storage 150, a security server 152, a customer database 154 and a business management server 156. The content server 146 in some embodiments includes, e.g., a broadcast file server (BFS), video on-demand (VOD) server, and a switched digital video (SDV) content server. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 158. The local network 158 is coupled via one or more network interfaces 160 to other networks and/or devices. For example, the headend 102 is coupled via network interface 160 to communications network 161, e.g., a cable network, and may also be coupled to one or more other external networks.

Via the cable network 161, the elements shown in the network headend 102 can send and/or exchange various information with the devices located at the customer premises 104, 106. As shown in FIG. 1, communications link 171 traversing the cable network 161 couples the CPEs at the customer premises 104, 106 to the various elements/servers shown in the network headend 102.

The content server 146, among other things, is responsible for delivering, e.g., broadcast, programming content including video on-demand content ordered by one or more customers and/or other information to one or more content playback devices which support receiving content by tuning to, e.g., QAM broadcast stream broadcasted by the server 146. The content server 146 also provides switched digital video (SDV) programming content to one or more content playback devices which support receiving SDV content. In various embodiments the content server 146 access the programming content from the content storage 150 and generates transport streams suitable for delivery to various CPEs via the communications network 161. The content storage 150 stores content, e.g., audio, video and/or other multimedia content. In some embodiments the content stream is encrypted prior to delivery to the CPEs over the communications network 161. Similarly in some embodiments an IP server access the programming content from the content storage 150 and generates transport streams suitable for delivery to various IP capable devices that may be, and in some embodiments are, located at the customer premises 104, 106.

The security server 152 in some embodiments is configured to generate appropriate licenses, encryption and decryption keys that can be used by one or more DVR devices for encrypting and decrypting programming content, e.g., recorded content. In accordance with one feature of some embodiments of the invention a playback device such as a set top box (STB) need to request a license and/or a key in order to be able to playback content that has been moved from a network attached storage (NAS) device where it had been stored. This aspect of generating licenses and keys to be provided to a requesting playback device is handled by the security server 152.

The customer database 154 includes, for a plurality of customers, customer information, account information and information regarding the devices installed at customer premises. In some embodiments customer account information includes, e.g., customer account number, customer subscription/service information, customer device capability and other billing related information. Customer database 154 also includes customer device information, e.g., identification and/or other information regarding customer devices such as the DVRs, cable modems, network attached storage (NAS) devices etc., installed at various customer premises served by the headend 102.

BM (Business management) server 156 processes billing information corresponding to customers serviced by the headend 102. This may include updating billing charge information in response to changes in services being provided to the customer, upgrades, on-demand content purchases, and/or other activity. BM server 156 also processes services bill payment information, e.g., payment transactions, deductions from debit accounts, mail bills, and/or processes discount and/or other information.

Referring now to the customer premises shown in the system. Each customer premise 104, 106 may include a plurality of CPEs. In various embodiments the CPEs located at the customer premises include, e.g., video recording devices, e.g., digital video recorder (DVR) devices, in addition to modems, routers, display devices etc. A DVR device may be included e.g., in a set top box, internet capable TV, personal computer, laptop, tablet device, smart phone etc. In various embodiments a DVR device is capable of recording and storing content, e.g., programming content delivered from the headend 102 and/or content transferred from another storage media. In FIG. 1 embodiment, customer premise 1 104 includes a plurality of devices including DVR 1 110 coupled to a display device 112, DVR 2 114 coupled to a display device 116, a cable modem 122 and a network attached storage (NAS) device 124. It should be appreciated that in some embodiments the DVRs 110, 114 are included in content playback devices, e.g., STB, which can be integrated in a device including a display. The various devices at the customer premise 1 104, e.g., DVRs 110, 114, the cable modem 122 and the NAS device 124 are coupled to the local home network 121 over which they communicate and exchange information. The display devices could be, e.g., standard televisions. The NAS device 124 is capable of storing content, e.g., recorded content, that may have been moved from a recording device such as DVRs 110, 114. Similarly, customer premise N 106 includes a plurality of DVR devices including DVR 1 130 coupled to a display device 132, and DVR 2 134 coupled to a display device 136, a cable modem 142 and a NAS device 144 which are coupled to the local home network 141.

Each digital video recorder (DVR) device can record programming content, e.g., based on a user's instruction or recording settings, and store the recorded content on the DVR. In various embodiments when initially any content is recorded by a DVR device, it will be stored locally on the DVR, that is, the initial location for any recorded content will be the DVR device.

The NAS devices 124, 144 are capable of storing content, e.g., moved from another playback/storage device including a DVR at the customer premises 104, 106 respectively. In accordance with some embodiments the NAS devices 124, 144 can be controlled to move content stored on the NAS devices 124, 144 to a playback/storage device located at the corresponding customer premises 104, 106.

Figure 2:
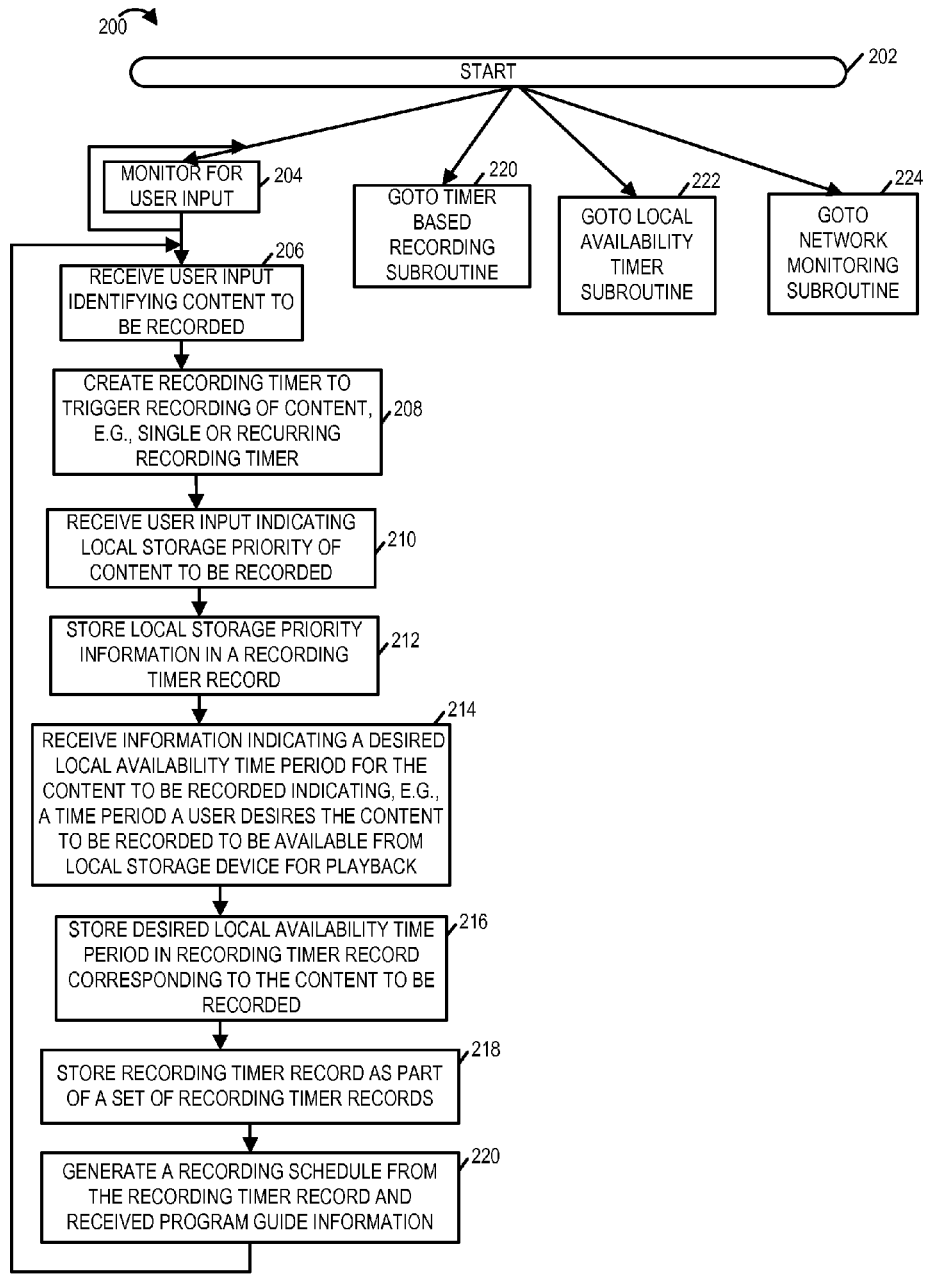
FIG. 2 is a flowchart illustrating the steps of an exemplary method performed by a recording device in accordance with one embodiment of the invention.

FIG. 2 is a flowchart 200 illustrating the steps of an exemplary method performed by a digital video recorder (DVR) device, e.g., DVR 1 110, in accordance with one embodiment of the invention.

The method starts in step 202 with the DVR device being placed into operation at a customer premise. Operation proceeds from start step 202 to step 204. The operation also proceeds to steps 220, 222, and 224 which correspond to different subroutines. Processing along the different paths may occur in an asynchronous manner. Step 220 corresponds to a timer based recording subroutine illustrated in detail in FIG. 3, step 222 corresponds to a local availability timer subroutine illustrated in FIG. 4, and step 224 corresponds to a network monitoring subroutine illustrated in detail in FIG. 5.

Returning to step 204. In step 204 the DVR device starts monitoring for user input, e.g., a control signal or other input. The input may be received from a user control device such as a remote control. It should be appreciated that monitoring for user inputs is performed on an ongoing basis.

Operation proceeds from step 204 to step 206. In step 206 a user input for recording content is received, identifying the content to be recorded. In some embodiments a user may simply select content, e.g., a program, for recording from a program guide displayed to the user. Operation proceeds from step 206 to step 208. In step 208 a recording timer used to trigger recording of user selected content is created. The recording timer may be a single event recording timer, e.g., triggering recording of the selected content once only, and/or may be a recurring recording timer that triggers, e.g., recording of user selected content on a recurring basis, for example, recording each new episode of the selected content that is broadcasted once every week.

Operation proceeds from step 208 to step 210. In step 210 a user input indicating local storage priority, corresponding to the selected content scheduled for recording, is received. The user input may be received in response to the user being presented an option to indicate a local storage priority for the content to be recorded. In various embodiments, local storage priority corresponding to a content indicates a user desired priority level for the content to be stored and locally available on the DVR. In various embodiments the local storage priority for content may vary from a lowest priority level of "0" to a maximum priority level of "3". The lowest priority level "0" indicating that local storage, e.g., on the DVR itself, of the corresponding content is not necessary and/or the user does not have a preference for the corresponding content to be locally available. The highest local storage priority level "3" indicates that local storage of the corresponding content is important and highly desired by the user. Other local storage priority levels, e.g., "1" and "2" indicating intermediate priority levels. Thus in case when one or more pieces of recorded content needs to be moved from the local storage on the DVR, then in some embodiments stored content with lowest local storage priority will be moved. It should be appreciated that additional conditions for moving recorded content may also be imposed, for example, in addition to local storage priority, the time period for which a piece of content has been stored on the DVR may also be considered.

Operation proceeds from step 210 to step 212 where local storage priority information is stored in a recording timer record. Operation proceeds from step 212 to step 214. In step 214, information indicating a user desired local availability time period for the content to be recorded is received, e.g., indicating a time period a user desires content to be recorded to be available from local storage for playback. Operation proceeds from step 214 to step 216. In step 216 the desired local availability time period is stored in the recording timer record corresponding to the content to be recorded. Thus a recording timer record corresponding to a content to be recorded includes information regarding the particular content to be recorded including information identifying the content, indicated local storage priority, desired local availability time period if any, recording timer type etc.

Operation proceeds from step 216 to step 218. In step 218 the recording timer record created for the content to be recorded in stored as part of a set of recording timer records. An exemplary set of recording timer records including a plurality of recording timer records corresponding to various different pieces of content to be recorded in illustrated in FIG. 3 and discussed in detail later.

Operation proceeds from step 218 to step 220. In step 220 a recording schedule is generated from the created recording timer record corresponding to the content to be recorded and program guide information that the DVR device receives from the service provider's network, e.g., headend 102. Operation proceeds from step 220 back to step 206 and various steps may be performed based on a received user input.

Figure 3:
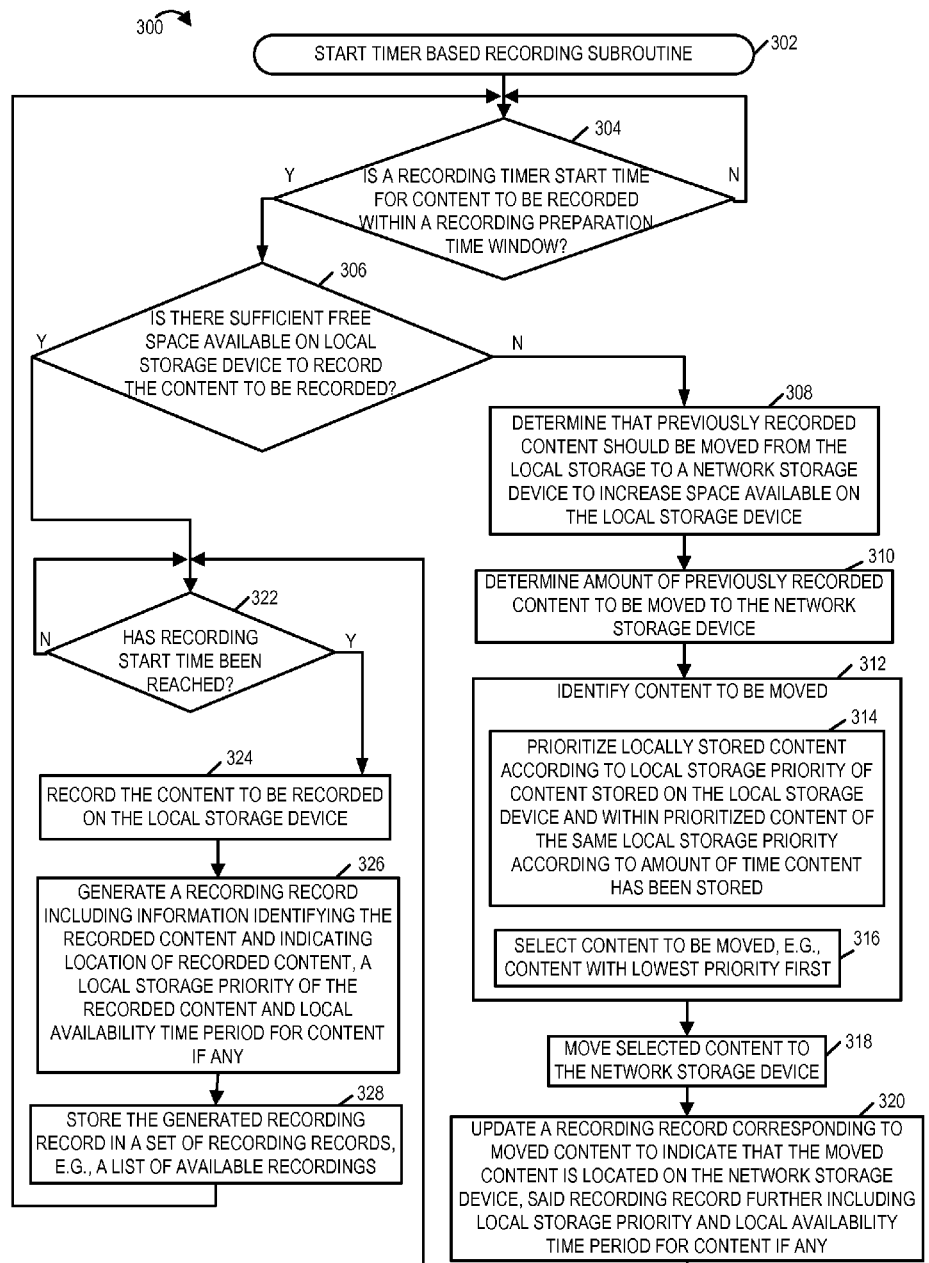
FIG. 3 is a flowchart illustrating the steps of an exemplary method performed when a timer based recording subroutine is executed, in accordance with some embodiments of the invention.

FIG. 3 is a flowchart 300 illustrating the steps of an exemplary method performed when the timer based recording sub-routine is executed, in accordance with some embodiments of the invention. The timer based recording sub-routine shown in flowchart 300 starts in step 302 where the subroutine is executed, e.g., in the DVR device, which may be included e.g., in a set top box.

Operation proceeds from step 302 to step 304. In step 304 it is determined if a recording timer start time corresponding to content to be recorded is within a recording preparation time window, e.g., a time interval needed to prepare the system, e.g., DVR device, to be able to record and store the content. The recording preparation time window includes expected time that may be needed to perform one or more checks/determinations to ensure the recording device's readiness for recording the content and for moving content, if needed, from the local DVR device to a network storage device, e.g., to increase the amount of storage on the local DVR device to record new content to be recorded. The recording timer start time corresponding to the content to be recorded is the time at which a scheduled recording is to start and is indicated in a recording schedule as will be discussed later. The recording preparation time window may be, and in some embodiments is, a predetermined time interval, e.g., 5 minutes. In some embodiments the recording preparation time window is not constant and may change depending on, e.g., the amount of data to be recorded, amount of data needed to be moved to create sufficient storage space for content to be recorded, expected amount of time needed to move the previously stored content from the DVR to a network storage device based on network congestion, etc. In some embodiments the determination in step 304 is performed periodically, e.g., at a rate faster than the recording preparation time period.

If it is determined that the recording timer start time for the content to be recorded is not within the preparation time window, the DVR does not take action for recording preparation and waits till the next check/determination is performed as indicated by the loop back in step 304. Thus after determining that recording timer start time for the content to be recorded is not within the recording preparation time window, the system will wait, e.g., for an amount equal to the recording preparation time window, and then again repeat step 304.

If it is determined that the recording timer start time for the content to be recorded is within the preparation time window, operation proceeds from step 304 to step 306. In step 306 it is determined if there is sufficient free space available on the local storage device, e.g., DVR, to record the content to be recorded. If it is determined that the available storage space on the local DVR is not sufficient, e.g., that a storage threshold has been reached, the operation proceeds from step 306 to step 308. If it is determined that there is sufficient available storage space on the local DVR for recording content to be recorded, the operation proceeds from step 306 to step 322. In step 308 it is determined that previously recorded content should be moved from the local storage device to a network storage device, e.g., NAS 124, to increase space available on the local storage device, e.g., for the content to be recorded.

Operation proceeds from step 308 to step 310. In step 310 the amount of previously recorded content to be moved to the network storage device to make room for new content to be recorded is determined. The amount of previously recorded content to be moved to the network storage device will vary depending on the amount of data to be recorded for which storage space is being made available on the local DVR device.

Operation proceeds from step 310 to step 312. In step 312, content to be moved from the local storage device is identified. As part of identifying the previously recorded content to be moved, steps 314 and 316 are performed. In step 314 previously recorded content on the DVR device is prioritized according to local storage priorities associated with various pieces of content stored on the DVR device. From amongst the prioritized content of same local storage priority, further prioritization is performed according to the amount of time the content has been stored on the local storage device, for example, the older content which has been stored for a longer period of time may be considered to have lower priority while recently recorded content is considered to have higher priority in some embodiments. An individual recorded piece of content has an associated local storage priority indicator set by the user. The local storage priority indicator indicates a priority level for local storage of the content, e.g., on the DVR device. The pieces of recorded content with no indicated local storage priority or with lowest local storage priority are considered to indicate that the user does not have a preference for local or network storage of the corresponding content in some embodiments. A piece of content having local storage priority "3" will be considered as having the highest priority for local storage while other pieces with local storage priority "2", "1", and "0" have priorities in the decreasing order. As should be appreciated there may be multiple individual pieces of recorded content with the same local storage priority. In some embodiments, such pieces of recorded content with the same local storage priority are prioritized according to the amount of time each individual piece of content has been stored on the local storage device. For example, if a recorded movie and TV show have the same local storage priority of "2" and the movie had been locally stored for 1 month while the recorded TV show has been locally stored for 3 weeks, the movie will be considered to have lower priority.

In step 316, following the prioritization in step 314, content to be moved is selected from the content that has been prioritized. In various embodiments, after prioritization has been completed, in step 316 the DVR device selects the content which is determined to have the lowest local storage priority, based on the criteria discussed above.

Operation proceeds from step 312 (including step 314 and 316) to step 318. In step 318 the selected content is moved to the network storage device, e.g., over the home network 121. Operation proceeds from step 318 to step 320 where a recording record corresponding to the moved content is updated to indicate that the moved content is located on the network storage device. Each recorded piece of content has a corresponding recording record that indicates, among other things, its storage location. When the content is moved from the local storage device to the network storage device, its location on the recording record is updated to reflect the correct storage location. The recording record further includes information indicating local storage priority and a desired local availability time period for the content if such information has been specified by a user for the content. Operation proceeds from step 320 to step 322.

Returning to step 322. In step 322 the DVR device checks if the recording start time for content to be recorded has been reached. If the recording start time has not been reached, the DVR device waits until the recording start time has been reached, e.g., until a counter till the recording start time expires. If it is determined that the recording start time for the content to be recorded has been reached, the operation proceeds from step 322 to step 324.

In step 324 the content to be recorded is recorded on the local storage device, e.g., on the DVR device. Operation proceeds from step 324 to step 326. In step 326 a recording record corresponding to the recorded content is generated, the recording record including information identifying the recorded content and indicating the location of the recorded content, a local storage priority of the recorded content and local availability time period for the recorded content if any.

Operation proceeds from step 326 to step 328. In step 328 the generated recording record for the recorded content is stored in a set of recording records, e.g., in a record including a list of available recordings. In some embodiments the recording records corresponding to various recorded pieces of content are stored on the local storage device but may be shared with the network storage device. In some embodiments the operation returns to step 304.

Figure 4B:
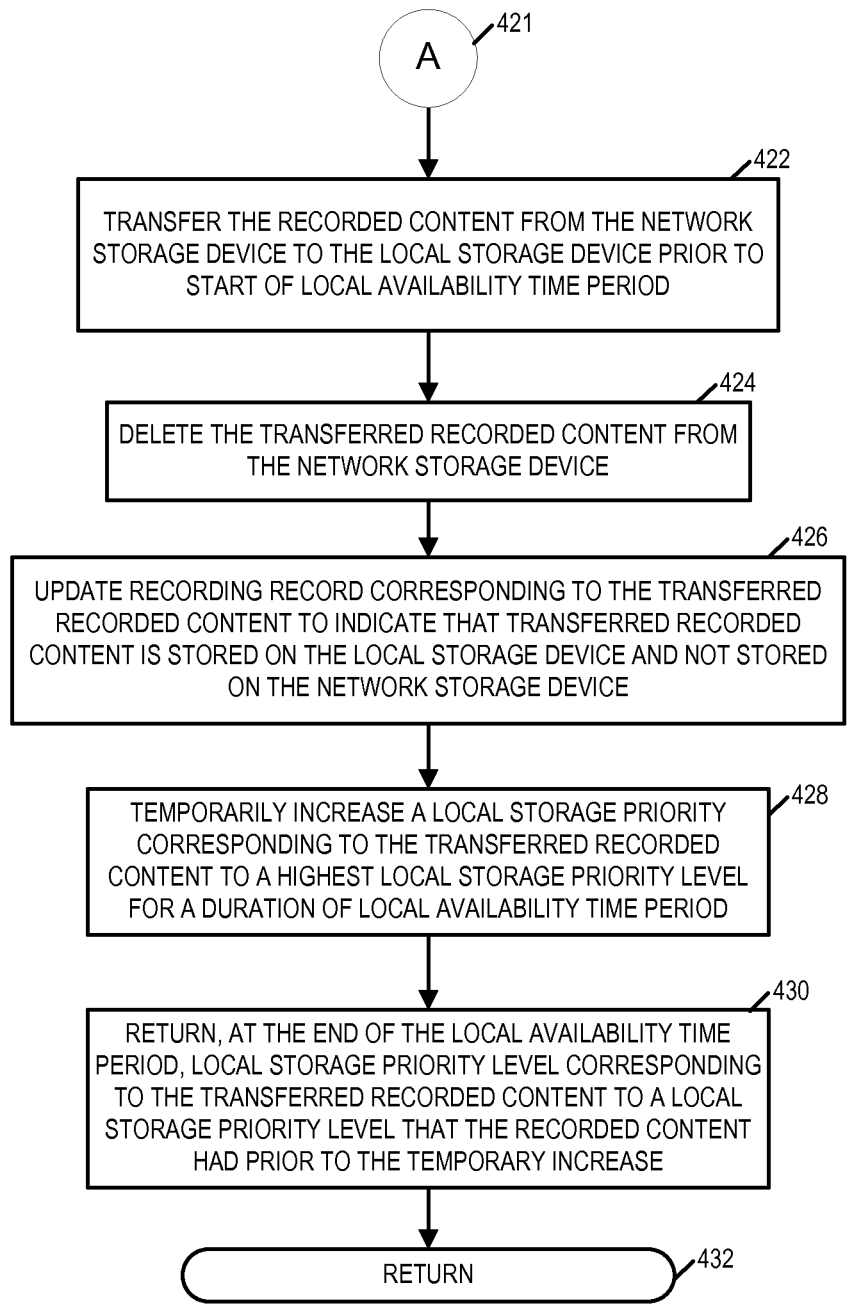
FIG. 4, which comprises the combination of FIGS. 4A and 4B, is a flowchart illustrating the steps of an exemplary method performed when a local availability timer subroutine is executed, in accordance with some embodiments of the invention.

FIG. 4, which comprises a combination of FIGS. 4A and 4B, is a flowchart 400 illustrating the steps of an exemplary method performed when the local availability timer subroutine is executed, in accordance with some embodiments of the invention. The local availability timer subroutine shown in flowchart 400 starts in step 402 where the subroutine is executed, e.g., in the DVR device.

In accordance with one aspect of some embodiments, a user is provided an option to enter a desired local availability time period which is a period of time when the user would like a recorded content to be available locally, i.e., on the local DVR device. In accordance with one feature of various embodiments, based on a user indicated local availability time period the DVR device runs the local availability timer subroutine to ensure that the corresponding recorded content is available locally, e.g., before the user indicated time starts. If the corresponding recorded content has been moved to the network storage device, the exemplary process illustrated in flowchart 400 ensures that the recorded content is moved to the local storage device prior to the local availability time period.

Operation proceeds from step 402 to step 404. In step 404 it is determined whether the start of a local availability time period for recorded content is within a local availability determination time window. The local availability determination time window is an expected time period which may be needed by the DVR device to determine the availability/storage location of recorded content which is desired to be locally available, check and prepare the local DVR device to be able to store the desired recorded content and transfer back the recorded content, in case if it is not locally stored on the DVR device at the given time, to the local DVR device. In some embodiments this local availability determination window is a predetermined time interval, e.g., 10 minutes. In some other embodiments the local availability determination window varies depending on various factors, e.g., such as the time of day as the congestion on home network 121 varies at different times of the day. For example, network may be highly congested when a plurality of devices connected to the network are streaming content while low congestion at other time, for example, between 9 AM-5 PM on weekdays when most of the people are at work. In various embodiments the local DVR device monitors the network congestion on the home network, e.g., local network e.g., WiFi, Ethernet etc. Other factors that may affect the local availability determination time window may include the amount of recorded content to be made locally available, amount of storage space available on the local storage device etc. It should be appreciated that more time may be needed to move larger amount of recorded content and that affects the local availability determination time window. Similarly, if the storage space available on the local storage device is not sufficient then the local storage device will need to create more storage space by moving some content to the network storage device before the recorded content for which local availability is desired at the indicated time can be moved from the network storage device to the local storage device. If it is determined that the start of the local availability time period for recorded content is not within a local availability determination window, the operation the DVR device waits till the next check/determination is performed as indicated by the loop back in step 404. In various embodiments the DVR device performs the determination in step 404 by comparing the local availability time period starting time information corresponding to various recorded items in a set of recording records and the local availability determination time window that is applicable at the time when determination is made. In various embodiments the determination step 404 is performed periodically, e.g., at a rate faster than the local availability determination time period.

If it is determined that the start of the local availability time period for recorded content is within a local availability determination window, the operation proceeds from step 404 to step 406. In step 406 it is determined whether the recorded content, for which the local availability time period is within the local availability determination window, is stored locally, e.g., on the DVR device or on the network storage device. If it is determined that the recorded content is stored locally on the DVR device and thus is already locally available, the operation proceeds from step 406 back to step 404. If it is determined that the recorded content is stored on the network storage device, the operation proceeds from step 406 to step 408.

In step 408 amount of recorded content to be moved from the network storage device to the local storage device is determined, i.e., determining the amount of data corresponding to the recorded content which has to be moved to the local storage device. Operation proceeds from step 408 to step 410. In step 410 it is determined if there is sufficient free space available on the local storage device, e.g., DVR, to store the recorded content to be moved from the network storage device. If it is determined that the available storage space on the local DVR is sufficient for the content to be moved from the network storage device, the operation proceeds from step 410 to step 422 via connecting node A 421.

If it is determined that the available storage space on the local DVR is not sufficient for the content to be moved from the network storage device, the operation proceeds from step 410 to step 412. In step 412 the local storage device (DVR device) determines that previously recorded content the local storage device should be moved to the network storage device to increase storage space available on the local storage device. It should be appreciated that the decision in step 412 is made as the local storage device does not have sufficient storage to store the recorded content for which local availability is desired and accordingly some previously recorded content needs to be moved from the local storage in order to create storage space for the desired content.

Operation proceeds from step 412 to step 414. In step 414, content to be moved from the local storage device to the network storage device is identified. As part of identifying the content to be moved, steps 416 and 418 are performed. In step 416 the previously stored content on the DVR device is prioritized according to local storage priorities associated with various pieces of content stored on the DVR device. From amongst the prioritized content of same local storage priority, further prioritization is performed according to the amount of time for which the content has been stored on the local storage device, for example, the older content that has been stored for a longer period of time may be considered to have lower priority while recently recorded content is considered to have higher priority in some embodiments. In step 418 the content to be moved, e.g., content with lowest priority, from the local storage device is selected.

Operation proceeds from step 414 to step 420. In step 420 the selected content is moved from the local storage device to the network storage device. Operation proceeds from step 420 to step 422 via connecting node A 421.

Referring now to step 422. In step 422 the recorded content that desired by the user to be locally available is moved from the network storage device to the local storage device prior to the start of the local availability time period. In various embodiments the recorded content is transferred over the home network, e.g., wired Ethernet, WiFi etc.

Operation proceeds from step 422 to step 424. In step 424 the copy of the transferred recorded content on the network storage device is deleted. Operation proceeds from step 424 to step 426. In step 426 the recording record corresponding to the transferred recorded content is updated to indicate that the transferred recorded content is stored on the local storage device and not on the network storage device.

Operation proceeds from step 426 to step 428. Once the recorded content has been transferred to the local storage device, in accordance with one feature of some embodiments in step 428 the local storage device temporarily increases a local storage priority level corresponding to the transferred recorded content to a highest local storage priority level for the duration of the local availability time period. For example, consider that a recorded movie has an associated local storage priority level of "1" and that the movie is currently stored in the network storage device. Further consider that the local availability time period desired by the user is approaching and the movie needs to be moved to the local storage device prior to the start of the local availability time period. In accordance with the process discussed that includes performing various checks, the movie is transferred from the network storage device to the local storage device. Once the movie is moved, in accordance with one feature of the invention the local DVR device temporarily increases the local storage priority level corresponding to the movie from "1" to "3" which is the highest local storage priority level for the entire duration of the local availability time period. This ensures that in case if some recorded content needs to be moved from the local DVR device, at least for the duration of the local availability time period the movie will not be moved since the corresponding local storage priority has been increased to the highest level and thus during prioritization process the movie will be given high preference to be kept on the local storage device.

Operation proceeds from step 428 to step 430. In step 430 at the end of the duration of the local availability time period the local storage priority level corresponding to the transferred recorded content is returned to its previous local storage priority level, i.e., the local storage priority level that the recorded content has prior to the temporary increase. Operation proceeds to step 432 and returns to the start of the subroutine.

In some embodiments, when it is determined (in step 406) that the recorded content is stored locally on the DVR device and is already locally available, the local storage priority level corresponding to the recorded content is temporarily increased to a highest local storage priority level for the duration of the local availability time period and at the end of the duration of the local availability time period the local storage priority level corresponding to the recorded content is returned to its previous local storage priority level.

Figure 5:
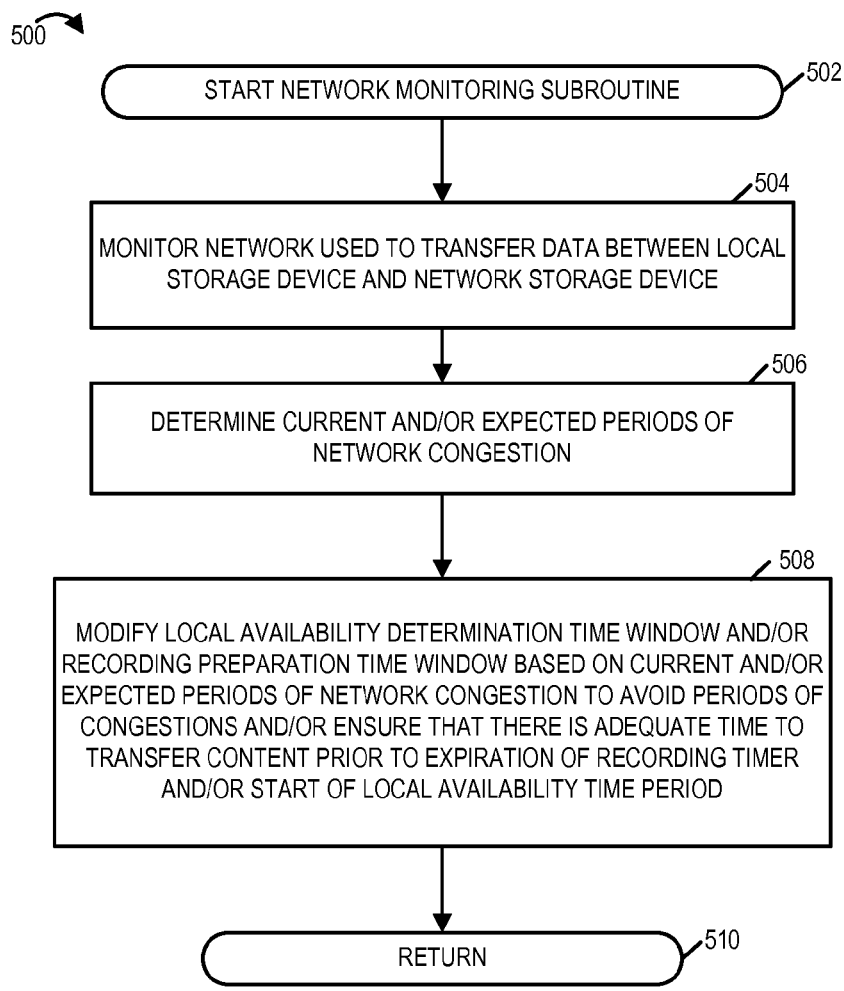
FIG. 5 is a flowchart illustrating the steps of an exemplary method performed when a network monitoring subroutine is executed, in accordance with some embodiments of the invention.

FIG. 5 is a flowchart 500 illustrating the steps of an exemplary method performed when a network monitoring subroutine is executed, in accordance with some embodiments of the invention. The network monitoring subroutine shown in flowchart 500 starts in step 502 where the subroutine is executed, e.g., in a DVR device, e.g., in a set top box. In some other embodiments, the network load monitoring operation is performed by another element such as a network controller, router or other network element aware of home network load.

In accordance with one aspect of some embodiments the local DVR device monitors the network used to transfer content between the local DVR device and the network storage device, e.g., home network 121, to determine periods of congestion on the network. Since the home network bandwidth is limited, during the periods of network congestion delays may be caused in the transfer of recorded content between the local storage device and the network storage device which are coupled to the home network and exchange information and data over the home network. In various embodiments the local DVR device monitors the home network so that various content transfer operations can be performed in a well calculated manner and avoid transferring content, to the extent possible, during peak periods of network congestion. In addition, network monitoring provides the local DVR device sufficient information to determine the amount of time the local DVR device would need to move content between itself and the network storage device, e.g., for recording new content scheduled for recording and/or making content locally available at user desired availability times.

Operation proceeds from step 502 to step 504. In step 504, monitoring of the network used to transfer content between the local DVR device and the network storage device, e.g., home network, is started. Operation proceeds from step 504 to step 506. In step 506, based on the result of monitoring, periods of congestion, e.g., current and/or expected periods of network congestion, are determined. For example lost packets, high packet jitter and/or a lower than desired achieved data rate over the local network may, and in some embodiments is, interpreted by the monitoring device as an indication of network congestion. In at least some embodiments, the local DVR device makes an assessment of local network congestion based on, e.g., lost packets, packet error rates, packet jitter, obtained packet data rate and/or received network loading messages and/or other network information and makes a determination regarding periods of heavy network loading.

Operation proceeds from step 506 to step 508. In step 508 the DVR device modifies, based on the determined current or expected periods of network congestion, local availability determination time window and/or recording preparation time window to avoid periods of network congestion and/or ensure that there is adequate time to transfer content prior to expiration of recording timer and/or start of local availability time period. Thus it should be appreciated that in various embodiments network monitoring proves beneficial in making informed decisions regarding moving of content between the local storage device and the network storage device. Operation proceeds to step 510 and returns to the start of the subroutine.

FIG. 6 illustrates an exemplary set of recording timer records 600, in accordance with some embodiments of the invention. The set of recording timer records 600 may be stored in a DVR device, e.g., in a set top box, in some embodiments. The set of recording timer records 600 includes a plurality of individual recording timer records shown in rows 610, 612, . . . , 620 in the set 600. Each individual recording timer record corresponding to an individual item, e.g., content, that has been selected by a user, e.g., from a program guide, for recording. Each row corresponds to an individual recording timer record that is created when a content, e.g., movie, TV show etc., is selected recording. Each of the columns 602, 604, 606 and 608 include information regarding the content to be recorded.

Each entry in column 602 includes content identification information, e.g., program title, program ID or another identifier corresponding to the content to be recorded. Each entry in column 604 includes a local storage priority level corresponding to the content identified in the corresponding row. Each entry in column 606 includes a user desired local availability time period corresponding to the content identified in the corresponding row. Each entry in column 608 indicates a type of recording timer record to which the entry corresponds, e.g., whether the recording timer is a single event recording timer or recurring event timer. In various embodiments information included in each of the columns is entered based on a user's input.

The local storage priority level corresponding to a content indicates a priority for the content to be locally available on the local storage device, with priority level "3" being the highest and "1" being the lowest. If and when there is need to move recorded content, e.g., to create more storage space for new content to be recorded, the local storage priority is used to prioritize the content stored on the local storage device in order to decide which piece of content should be moved and which one should be left stored on the local storage device. The user desired local availability time period corresponding to a content indicates a time period during which the user desires the content to be locally available on the local DVR device.

Row 610 corresponds to a first recording timer record corresponding to the content identified in the first entry of column 602, i.e., "Grey's Anatomy, Season 9". The corresponding first entry in column 604 indicates the user selected local storage priority level of "1" for the content "Grey's Anatomy". The corresponding first entry in column 606 indicates the user desired local availability time period to be FRIDAY 8:30 PM-12:00 AM which indicates that during the time period the user desires "Grey's Anatomy" to be locally available on the local DVR device. For example, the user may like to watch the recorded episode of "Grey's Anatomy" on Friday night, e.g., after dinner, and thus would like the recorded episode to be available on the local DVR device at that time. Thus in accordance with one feature of some embodiments, the user can specify the desired local availability time period, e.g., when scheduling recording or even later. It should be appreciated that the desired local availability time period is beneficial in the sense that if even the recorded content had been moved from the local storage device to the network storage device, the indication of the local availability time period ensures that the recorded content is moved back to the local DVR device prior to the user desired time period and thus when the user wants to watch the recorded content at the desired time the user would not need to wait and waste time in moving the content back to the local device for watching. The corresponding first entry in column 608 indicates that the recording timer record in row 610 is a recurring type timer record. Thus if the content to be recorded, e.g., Grey's Anatomy in this case, is a weekly show with a new episode being aired every week the recording timer record controls the DVR device to record Grey's Anatomy on a recurring basis, e.g., with a new episode being recorded each week and without the user having to manually schedule recording every week.

Row 612 corresponds to another recording timer record corresponding to the content identified in the corresponding (second) entry of column 602, i.e., "SKYFALL". The corresponding entry in column 604 indicates the user selected local storage priority level of "3" for "SKYFALL". The highest local storage priority level of "3" obviously indicating the user's strong preference to keep the movie on the local DVR device. The corresponding entry in column 606 is blank indicating that the user has not specified a desired local availability time period. However since it has the highest local storage priority, in situations when recorded content needs to be moved from the local storage device to the network storage device, "SKYFALL" will be given a high priority for local storage during prioritization operation, e.g., as discussed in detail in FIG. 3 (step 312) and FIG. 4 (step 414). The corresponding entry in column 608 indicates that the recording timer record in row 612 is a single event timer. Thus the movie "SKYFALL" will be recorded only once and any repeated broadcast of the movie will not be recorded.

Similarly there may be numerous other recording timer records in the set of time records 600. The last recording timer record in the set 600 is shown in row 620 that corresponds to the content identified in the corresponding (last) entry of column 602, i.e., "OFFICE". The corresponding entry in column 604 indicates the user selected local storage priority level of "0" for "OFFICE". The lowest local storage priority level indicating that the user most likely considers this recorded piece of content, i.e., OFFICE, to be of low importance for storage on the local device. Thus in situation when previously recorded content needs to be moved from the local storage device to the network storage device, "OFFICE" will be given a low priority for local storage during prioritization operation. The corresponding entry in column 606 indicating that the user specified desired local availability time period is SATURDAY 1:00 PM-4:00 PM. The corresponding entry in column 608 indicates that the recording timer record in row 620 is a recurring event timer.

FIG. 7 illustrates an exemplary set of recording schedules 700, generated in accordance with some embodiments of the invention. The set of recording schedules 700 is stored in a DVR device, e.g., in a set top box, in some embodiments. The recording schedules 700 includes a plurality of individual recording schedules shown in rows 720, 722, . . . , 730 in the set 700. Each individual recording schedule corresponding to an individual item, e.g., content, that has been selected by a user, e.g., from a program guide, for recording. Each recording schedule is generated using information included in a corresponding recording timer record such as the ones illustrated in FIG. 6 and program guide information. Each recording schedule includes information that controls the DVR device to record the identified content at the indicated time. Each row corresponds to an individual recording schedule that is generated when a recording for some content, e.g., movie, TV show etc., is scheduled.

Each entry in column 702 includes content identification information, e.g., program title, program ID or another identifier corresponding to the content scheduled for recording. Each entry in column 704 includes channel and/or network information, e.g., information regarding channel number and/or or broadcast network on which the content to be recorded is going to be aired. Each entry in column 706 indicates the day and/or date on which the identified content is scheduled to be recorded. Each entry in column 708 indicates the recording start time, e.g., time at which recording is to begin while each entry in column 710 indicates the recording end time, e.g., time at which recording is to end for the content in the corresponding row. Each entry in column 712 indicates an estimated amount of data corresponding to the content that is scheduled for recording in the corresponding row.

Row 720 corresponds to a first recording schedule corresponding to the content identified in the first entry of column 702, i.e., "Grey's Anatomy, Season 9". The corresponding first entry in column 704 indicates the channel number on which the content, i.e., Grey's Anatomy, will be aired. In some embodiments the channel number and/or network information is automatically picked from the program guide when a user selects the content while scheduling the recording. The corresponding first entry in column 706 indicates the recording day and/or date for the scheduled recording of "Grey's Anatomy, Season 9" is FRIDAY Feb 2, 2013. The corresponding first entries in columns 708 and 710 indicate the recording start (e.g., 9:00 PM) and end time (e.g., 10:00 PM). In various embodiments the entries in columns 706, 708 and 710 are also automatically populated using the information from the program guide. The first entry in the last column 712 indicates the estimated amount of data to be recorded, e.g., data corresponding to the episode of "Grey's Anatomy, Season 9" episode scheduled to be recorded. The estimates amount of data provides a good approximation of the amount of storage space that is needed for recording the content on the local DVR device. Thus in row 720, the corresponding entry in column 712 indicates "0.25 GB" (gigabytes) of data will be recorded when scheduled recording is completed and thus a corresponding amount of empty memory storage will be needed.

Row 722 corresponds to another recording schedule corresponding to the content identified in the corresponding (second) entry of column 702, i.e., "SKYFALL". The corresponding entry in column 704 indicates that SKYFALL will be aired channel number 104. The corresponding entry in column 706 indicates that the movie SKYFALL is scheduled for recording on SATURDAY Feb 2,2013. The corresponding entries in columns 708 and 710 indicate the scheduled recording starts at 7:30 PM and ends at 10:00 PM respectively. The corresponding entry in column 712 indicates that approximately 0.6 GB of data will be recorded when the scheduled recording for SKYFALL is completed.

Similarly there may be numerous other recording schedules in the set 700. The last recording schedule in the set 700 is shown in row 730 that corresponds to the content identified in the corresponding (last) entry of column 702, i.e., "OFFICE". Corresponding to row 730, the entry in column 704 indicates that "OFFICE" will be aired channel number 152. The corresponding entry in column 706 indicates that scheduled recording "OFFICE" is on SATURDAY Feb 2, 2013, e.g., the new/latest episode will be recorded on the indicated day and date. The corresponding entries in columns 708 and 710 indicate the scheduled recording starts at 8:30 PM and ends at 9:00 PM respectively. The corresponding entry in column 712 indicates that approximately 0.15 GB of data will be recorded when the scheduled recording for the episode of OFFICE is completed.

FIG. 8 illustrates an exemplary set of recording records 800, in accordance with some embodiments of the invention. The set of recording records 800 may be stored in a DVR device, e.g., DVR 110, in some embodiments. For discussion purposes consider that the set of recording records 800 is stored on the DVR 110 at customer premise 104.

The set of recording records 800 includes a plurality of individual recording records shown in rows 820, 822, . . . , 840. The set of recording records 800 can be accessed by a user of the DVR device 110 in the same or similar manner as the program guide and provides information regarding the recorded items that are available on the user's DVR device and/or on the network storage (NAS) device. The set of recording records 800 in some embodiments includes information recorded items recorded by a user on the DVR device 110 as well as other recorded items that are available on the network storage device that may have been recorded by someone else at the customer's premise, e.g., by another household member.

Each individual recording record shown in the rows 820, 822, . . . , 840 corresponds to an individual item, e.g., content, that has been recorded and can be accessed by the user. In the illustrated set of recording records 800, the group of recordings 850 shown in the figure illustrates a collection of recorded items that had been initially recorded by a user on the DVR device 110, e.g., the initial location of the recorded items in group 850 was the DVR device 110 on which the set of recording records 800 is stored. The other group of recordings represented by reference number 852 includes the recorded items that are not recorded using the DVR device 110 but are available for a user to watch if the user desires to do so. The group of recordings 852 includes recorded items that are stored in the network storage device and may have been recorded by one or more other users at the customer premise but using a different recording device, e.g., a different DVR device than the DVR device 110 on which the recorded items in the group 850 were initially recorded. In some embodiments as new recorded items are added and/or deleted the set of recording records is updated periodically to reflect the changes the set 800. In some embodiments the group 850 of recorded items appears as e.g., "My Recordings" to a user viewing the set of recordings 800 indicating that the group 850 includes the recorded items that were recorded by a user on the DVR device 110 while the second group of recorded items 852 appears as "Additional Recordings" indicating that group 852 includes additional available recorded items available on the network storage device. It should be appreciated that storage location of one or more items in the group 850 may be the network storage device.

Each recording record is created and added to the set of recording records 800 following the completion of a scheduled recording for the particular item. The information included in each recording record is generated using information included in a corresponding recording timer record, recording schedule and program guide information.

Each column includes some specific information regarding the recorded item in the corresponding row. Each entry in column 802 includes content identification information, e.g., program title, or another identifier corresponding to the recorded content. Each entry in column 804 includes the location of the recorded content indicating, e.g., whether the recorded item is stored on the local DVR device or the network storage device. Each entry in column 806 indicates the local storage priority of the corresponding recorded item in the corresponding row. This however applies to the user's own recordings, i.e., the recordings made using the local DVR device 110 shown collectively in the group 850. The local storage priority for the other recordings in the other group 852 is set to "0" by default and these recorded items are stored on the network storage device. Each entry in column 808 indicates the user desired local availability time period during which the user desires the corresponding recorded item to be locally available on the DVR device. Again, the local availability time period applies to the user's own recordings made using the local DVR device 110 shown collectively in the group 850 and not to the recordings in the other group 852. Each entry in column 812 indicates an amount of data corresponding to the recorded content in the corresponding row.

Consider the first row 820 indicates a first recording record in the group of recordings 850. The corresponding first entry in column 802 identifies the recorded content, i.e., "Grey's Anatomy, Season 9". The corresponding first entry in column 804 indicates the location of the recorded item which indicates that the recorded item, i.e., Grey's Anatomy, is currently stored locally, e.g., on the DVR 110. The corresponding first entry in column 806 indicates the local storage priority level for the recorded item is "1". The corresponding first entry in column 808 indicates the desired local availability time period for the recorded item is "Friday 8:30 PM-12:00 AM. The corresponding first entry in column 810 indicates that the amount of data corresponding to the recorded item stored on the DVR device is 0.25 GB.

The group of recording records 850 may include a plurality of other recording records in addition to record 820, e.g., 822, . . . , 830 as illustrated. The second row 822 includes similar information corresponding to a recorded item, i.e., the movie SKYFALL, as shown. The corresponding entry in column 804 indicates that the movie is stored locally. The corresponding entry in column 806 indicates that user selected local storage priority level is "3" while the corresponding entry in column 808 is blank indicating that the user has not specified a desired local availability time period. The corresponding entry in column 810 indicates that the amount of data corresponding to the recorded item stored on the local DVR device is 0.6 GB. The last recording record in the group 850 is shown in row 830. Row 830 corresponds to a recording record for the recorded item "OFFICE" identified in the corresponding entry in column 802. The corresponding entry in column 804 indicates the location of the recorded item "OFFICE" is currently stored on the network storage device. The recorded item is initially recorded on the local DVR device but may have been moved later, e.g., to increase the amount of storage space on the DVR device. The corresponding entry in column 806 indicates the local storage priority level for the recorded item is "0". The corresponding entry in column 808 indicates the desired local availability time period for the recorded item is "Saturday 1:00 PM-4:00 PM. The corresponding entry in column 810 indicates that the amount of data corresponding to the recorded item stored on the network storage device is 0.15 GB.

The group of recorded items 852 shows additional recordings that are available for the user to watch. The group 852 includes rows 831, 832, . . . , 840 with each row corresponding to an individual recording record. Row 831 corresponds to a recording record for the recorded movie "BATMAN FOREVER" identified in the corresponding entry in column 802. The corresponding entry in column 804 indicates that the recorded movie is located on the network storage (NAS) device. The corresponding entry in column 806 indicates the local storage priority level for the recorded item is "0" however this is defaulted to the lowest priority level of "0" since the recorded item "BATMAN FOREVER" was not recorded by the user on the local storage device 110 and no local storage priority was assigned for storage on the local DVR device 110. The corresponding entry in column 808 indicates no desired local availability time period as should be appreciated from the fact that from the perspective of the user of DVR device 110 the item "BATMAN FOREVER" was not desired to be locally available on the DVR device 110 or even recorded. The corresponding entry in column 810 indicates that the amount of data corresponding to the movie stored on the network storage device is 0.5 GB. Other recording records in rows 832 through 840 in the group 852 include similar information regarding the corresponding recorded items stored on the NAS device and will not be discussed in detail.

It should be appreciated that the group 850 of recorded items is DVR device specific and the recording records in the group 850 vary depending on the DVR device as different recordings may have been made on different DVR devices, e.g., at the customer premise 104. Thus while group 850 illustrates the recorded items which were recorded initially by a user on the DVR device 110, a similar group of recording records for a different DVR device may include different recordings.

Figure 9:
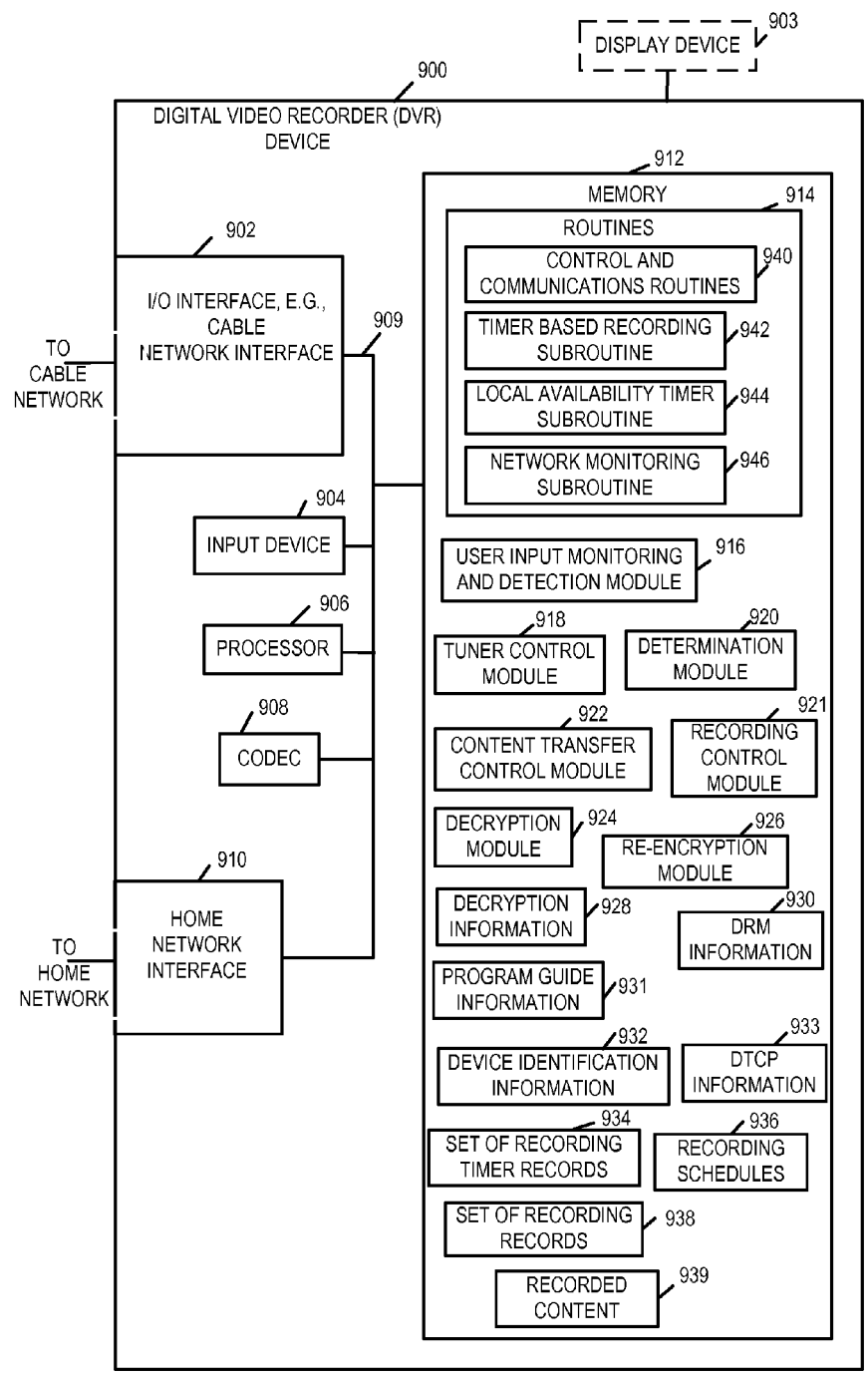
FIG. 9 illustrates an exemplary recording device, e.g., a DVR device, in accordance with an exemplary embodiment of the invention.

FIG. 9 illustrates an exemplary DVR device 900 implemented in accordance with one exemplary embodiment. The DVR device 900 in some embodiment is included in, e.g., a set top box or another device capable of receiving content supplied by the service provider and playing back content. The DVR device 900 can be used as any one of the DVR devices illustrated in FIG. 1, e.g., DVR device 110, 114 etc.

As shown, the DVR device 900 includes an Input/Output (I/O) interface 902, an input device 904, a processor 906, a codec (Coder/Decoder) 908, a home network interface 910, and a memory 912 coupled together via a bus 909. The various elements of the DVR device 900 can exchange data and information over the bus 909. In some embodiments, the DVR device 900 is coupled to a display device 903, e.g. a monitor and/or a Television (TV). In some other embodiments the DVR device 900 is included in a device that includes a display, e.g., such as a display screen of a tablet device (e.g., iPAD) or laptop computer.

Via the I/O interface 902, the DVR device 900 can exchange signals and/or information with other devices and/or system elements such as content server 146 and/or security server 152 in the network headend 102, over the cable network 161. Thus the I/O interface 902 supports the receipt and/or transmission of content and/or other information from/to different devices and servers located outside the customer premise, e.g., such as the content server 146. The I/O interface 902 includes a receiver and transmitter to support such operations and may, and in some embodiments does, include a built-in cable modem. In addition, the I/O interface 902 in some embodiments also includes, e.g., an infrared signal receiver to receive signals from a user remote control device. Thus in some embodiments the I/O module 902 may include, in addition to a cable network interface, an IR or radio interface for receiving signals from a remote control device.

Via the home network interface 910 the DVR device 900 can exchange signals and/or information including recorded content with other customer premise devices such as a network attached storage (NAS) device, e.g., NAS device 124, over a local network, e.g., home network 121. The home network interface 910 supports the receipt and/or transmission of content, and/or other information over the local network 121 from/to the NAS device or other customer devices. For example in various embodiments recorded content can be transferred between the DVR device 900 and a NAS device located at the customer premise where DVR device 900 is located over the home network 121 via the home network interface 910. The home network interface 910 includes a receiver and transmitter to perform the receiving and transmitting operations respectively.

The input device 904 may be a keypad, touch screen, and/or a microphone for receiving and processing voice input commands. The processor 906, e.g., a CPU, executes routines 914 and one or more modules and controls the DVR device 900 to operate in accordance with the invention. The processor 906 is responsible for controlling the general operation of the DVR device 900 including, e.g., controlling recording of content in accordance with a user's scheduling, executing subroutines and implementing corresponding processes, presentation of information and/or programs. To control the DVR device 900, the processor 906 uses information, various modules and/or routines including instructions stored in memory 912. The Codec 908 is implemented as a module and is capable of performing encoding and/or decoding operations on a digital data stream or signal.

In addition to the routines 914, the memory 912 includes a user input monitoring and detection module 916, a tuner control module 918, content determination module 920, a recording control module 921, a content transfer control module 922, a decryption module 924, and a re-encryption module 926. Information stored in memory 912 includes decryption information 928, DRM (digital rights management) information 930, program guide information 931, device identification information 932, DTCP information 933, set of recording timer records 934, set of recording schedules 936 and set of recording records 938. Memory further includes recorded content 939 which is the locally stored recorded content.

Routines 914 include communications routines and/or device control routines 940. Routines 914 further include various subroutines which control the DVR device to implements the methods in accordance with the invention. The subroutines include a timer based recording subroutine 942, a local availability timer subroutine 944 and a network monitoring subroutine 946. The timer based recording subroutine 942, when executed by the processor 906, controls the DVR device 900 and/or one or more elements of the DVR device 900 to implement the functions corresponding to the steps illustrated in FIG. 3. The local availability timer subroutine 944, when executed by the processor 906, controls the DVR device 900 and/or one or more elements of the DVR device 900 to implement the functions corresponding to the steps illustrated in FIG. 4. The network monitoring subroutine 946, when executed by the processor 906, controls the DVR device 900 and/or one or more elements of the DVR device 900 to implement the functions corresponding to the steps illustrated in FIG. 5.

The user input monitoring and detection module 916 is configured to monitor for and detect a user input, e.g., input from a user. The user input may be sent by a control device such as a remote control, or by other means, e.g., selecting an option by pressing a button on the DVR device 900 or an icon on a touch screen etc. The user input monitoring and detection module 916 determines, on receipt of an input, e.g., a control signal providing user input, what type of selection has been made by the user, e.g., a channel selection instructing to record a selected content, tune to a specific channel, a program guide selection etc. User input signals from a remote control may be received via I/O interface 902. For example, received inputs from a user in some embodiments include, e.g., input identifying content to be recorded, input indicating a local storage priority and desired local availability time period for content to be recorded.

The tuner control module 918 is configured to tune to a frequency corresponding to a selected program channel to be viewed, e.g., a user selected channel. The determination module 920 is configured to determine, prior to start of a recording time used to trigger recording of a particular piece of content, whether or not the local DVR device 900 has sufficient available recording space (in local storage, e.g., memory 912) to record selected content to be recorded. The determination module 920 is further configured to determine if previously recorded content should be moved from the local storage device 900 to a network storage device, e.g., NAS device 124, to increase space available on the local DVR device 900. The determination module 920 is further configured to identify content to be moved to the network storage device based on the local storage priority of individual pieces of content stored on said local storage device when it is determined that previously recorded content should be moved from said local storage to network storage.

The recording control module 921 is configured to record user selected content on the local DVR device 900. In some embodiments the user selected content has a corresponding local storage priority determined based on a user input indicating local storage priority of the selected content. The user selected content identification information, local storage priority, desired local availability time period, and other recording related information is stored in the set of recording timer records 934. In some embodiments the recording control module 921 controls recording based on the timer based recording subroutine 942.

In some embodiments the determination module 920 is further configured to identify previously recorded content to be moved from the local storage e.g., memory 912, in the DVR device 900 to the network storage device as a function of local storage priority indicator value associated with individual pieces of content stored on said local storage device. In some embodiments the determination module 920 is further configured to identify, as part of identifying content to be moved, content having a lowest local storage priority from among the previously stored content on the local storage in the DVR device 900 and select the identified content to be moved to the network storage device. In some embodiments when there is more identified content having a lowest local storage priority than is necessary to move to achieve a desired amount of free space on the DVR device, the determination module 920 selects content to be moved as a function of the amount of time the content has been stored on the DVR device, e.g., the oldest data is transferred to the NAS device first in some embodiments since older data is less likely to be played than recently recorded data. In some embodiments the determination module 920 is further configured to determine, if a recorded item is stored locally, e.g., in memory 912, on the DVR device 900 or on the network storage device. In some embodiments this is determined by accessing recording records 938 stored in the memory 912.

The content transfer control module 922 is configured to control moving of content to the network storage device, e.g., to increase space available on the local DVR device. The content transfer control module 922 is further configured to control transferring of content from the network storage device to the local DVR device 900, e.g., to make the content locally available for a user to watch based on an indicated user desired local availability time period. In some embodiments the transfer control module 922 sends a request signal to the NAS device where recorded content to be transferred is located, requesting the NAS device to send a recorded item to the DVR device 900. In some embodiments the processor 906 is configured to: temporarily increase the local storage priority of the recorded item, transferred/moved from the NAS device, to the highest priority if the content moved from the NAS device to the local storage in the DVR device 900 has a lower local storage priority than the highest local storage priority and treat the content moved from the NAS device to the DVR device as having a highest local storage priority for the user desired period of time.

In some embodiments the processor 906 is further configured to delete the transferred content from the NAS device, and update a set of stored information indicating the location of stored content to indicate that said transferred first content is stored locally on the DVR device 900 and not stored on the NAS device. In some embodiments the processor 906 is further configured to return, at the end of the user desired period of time, the local storage priority of the moved content to the local storage priority that the moved content had prior to the temporary increase.

The decryption module 924 is configured to decrypt content to be moved to a network storage device prior to transferring the content. In some embodiments the decryption is performed using the decryption information 928 which is supplied by the security server 152 in the network headend 102. In some embodiments, after decryption has been performed, the content to be moved to the network storage device is re-encrypted by the re-encryption module 926 using a device flexible DRM key, e.g., that encrypts the content such that it can be decrypted by another device, e.g., a content playback device, that obtains a properly generated DRM license file. The device flexible DRM key/license is obtained from the security server 152 and stored in the memory as DRM information 930. In some embodiments the DVR device 900 is not able to encrypt the recorded content in device flexible DRM manner but rather uses some other encryption to encrypt the recorded content stored on the DVR device 900. In some such embodiments prior to the recorded item being moved the decryption module decrypts the content and the re-encryption module 926 re-encrypts the content in DTCP (digital transmission content protection) in accordance with DTCP information 933, prior to the recorded item being moved to the NAS device.

Program guide information 931 includes information used to generate a program guide that provides details regarding various programs, e.g., movies and shows, that a user can watch. The program guide information 931 is received from the headend 102. Device identification information 932 includes identification information corresponding to the DVR device 900 and various other devices, e.g., other DVR devices 114, NAS device, cable modems, routers etc., located at the customer premise where DVR device 900 is located.

The set of recording timer records 934 includes a plurality of recording timer records which include information regarding content to be recorded on the DVR device 900. The set of recording timer records 934 is the same or similar to the set of recording timer record 600 illustrated in FIG. 6. The set of recording schedules 936 includes a plurality of recording schedules corresponding to programming content scheduled for recording on the DVR device 900. The set of recording schedules 936 is the same or similar to the set of recording schedules 700 illustrated in FIG. 7. The set of recording records 938 includes a plurality of recording records corresponding to the recorded items which can be accessed by a user of the DVR device 900. The set of recording records 938 is the same or similar to the set of recording records 800 illustrated in FIG. 8. The recorded content 939 includes the recorded content which is locally stored on the DVR 900.

In some embodiments the processor 906 executes various subroutines in the memory to control the operation of the DVR device 900. For example, when executed by the processor 906, the timer based recording subroutine 942 control the processor 906 to perform the function corresponding to each of the steps illustrated in FIG. 3. When executed by the processor 906, the local availability timer subroutine 944 control the processor 906 to perform the function corresponding to each of the steps illustrated in FIG. 4. Similarly, when executed by the processor 906, the network monitoring subroutine 946 control the processor 906 to perform the function corresponding to each of the steps illustrated in FIG. 5.

Figure 10:
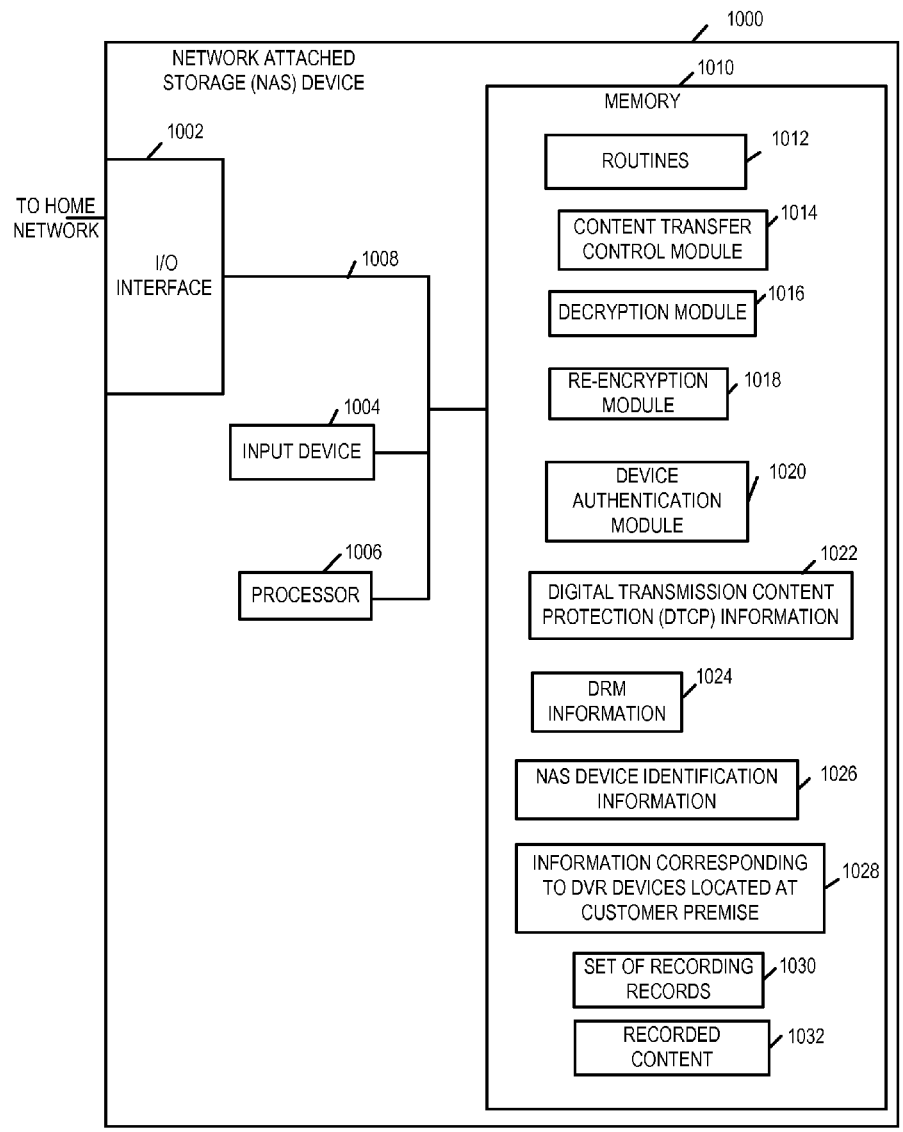
FIG. 10 illustrates an exemplary network attached storage (NAS) device, in accordance with an exemplary embodiment of the invention.

FIG. 10 illustrates an exemplary network attached storage (NAS) device 1000 implemented in accordance with one exemplary embodiment. The NAS device 1000 can be used as any one of the NAS devices illustrated in FIG. 1, e.g., NAS device 124 and/or NAS device 144.

As shown, the NAS device 1000 includes an Input/Output (I/O) interface 1002, an input device 1004, a processor 1006, and a memory 1010 coupled together via a bus 1008. The various elements of the NAS device 1000 can exchange data and information over the bus 1008.

Via the I/O interface 1002, the NAS device 1000 can exchange signals and/or information including recorded content with other devices, e.g., such as DVR devices or other devices located at the customer premise where NAS device 1000 is located. In various embodiments the exchange of signals and/or information is over a local network, e.g., home network. Thus the I/O interface 1002 supports the receipt and/or transmission of content and/or other information from/to different devices. The I/O interface 1002 may, and in some embodiments does, include a built-in cable modem. Thus in various embodiments the NAS device 1000 receive and/or send recorded content from/to a DVR device, e.g., DVR device 900, over a local network, e.g., home network 121 via the interface 1002.

The input device 1004 may be a keypad, touch screen, and/or a microphone for receiving and processing voice input commands. The processor 1006, e.g., a CPU, executes routines 1012 and one or more modules, and controls the NAS device 1000 to operate in accordance with the invention. The processor 1006 is responsible for controlling the general operation of the NAS device 1000 including, e.g., controlling transfer of recorded content to a DVR device, e.g., when a request is received from a DVR device to access/move recorded content. To control the NAS device 1000, the processor 1006 uses information, various modules and/or routines including instructions stored in memory 1010.

In addition to the routines 1012, the memory 1010 includes a content transfer control module 1014, a decryption module 1016, a re-encryption module 1018, and a device authentication module 1020. Information stored in memory 1010 includes DTCP information 1022, DRM (digital rights management) information 1024, NAS device identification information 1026, identification information corresponding to other devices 1028, set of recording records 1030, and recorded content 1032 which is the recorded content stored in the NAS device 1000.

Routines 1012 include communications routines and/or device control routines. Routines 1012, when executed by the processor 1006, control the NAS device 1000 and/or one or more elements of the NAS device 1000 to perform various functions in accordance with the invention.

The content transfer control module 1014 is configured to control the transfer of recorded content, e.g., receipt of recorded content from the DVR device and sending of recorded content to the DVR device. Thus when a DVR device moves some recorded item form the DVR device to the NAS device 1000, the content transfer control module accepts the recorded content and provides to one or more elements for additional processing if needed and stores the received recorded item in the NAS device as part of the recorded content 1032. In the event when the NAS device receives a request to move some recorded item stored in the NAS device 1000 to the DVR device, the transfer control module 1014 processes a transfer request received from the DVR device and transfers, e.g., copies and moves, the particular item identified in the received transfer request, to the DVR device.

Decryption module 1016 is configured to decrypt received recorded content if the recorded content received from a DVR device is encrypted in non device flexible DRM manner, i.e., if the recorded content is encrypted in way that it cannot be decrypted by other devices using a secure DRM license file. In various embodiments the DRM license file/key is provided by the network headed 102 that supplied the content which was recorded. Other devices include, e.g., other DVR devices at a customer premise which may request the recorded content from the NAS device 1000. In some embodiments a DVR device is not able to encrypt a recorded content in device flexible DRM manner. In some such cases prior to transferring the recorded item to the NAS device 1000, the DVR device protects the content by encrypting the content in DTCP. When the NAS device 1000 receives the DTCP protected content the decryption module decrypts the DTCP protected content using DTCP information 1022. In some embodiments the decrypted content is then re-encrypted by the re-encryption module 1018 in a device flexible DRM format using the DRM information 1024.

The device authentication module 1020 is configured to check that a device requesting access to the recorded content stored in the NAS device is authentic and is allowed to access and/or move the recorded content stored in the NAS device 1000.

The NAS device identification information 1026 includes identification information corresponding to the NAS device 1000, e.g., device identifier, MAC address etc. The identification information corresponding to other devices 1028 includes identification information corresponding other devices, e.g., DVR devices and/or other content playback devices, which are authorized to access and/or move content from and/or to the NAS device 1000.

The set of recording records 1030 includes a plurality of recording records corresponding to the recorded items which are stored in the NAS device. The set of recording records 1030 is the same or similar to the group of recording records 852 shown in the set 800 in FIG. 8. The recorded content 1032 includes the recorded content which is stored on the NAS device 1000.

Some of the features and advantages of the methods and apparatus of the present invention will now be discussed.

Currently recording devices, e.g., DVRs, have a finite amount of storage for content, e.g., video and/or other multimedia content. Also, content that is stored on a DVR is securely linked to that DVR such that if a user removed the hard disk drive (HDD) containing the stored content from one DVR, and put that HDD into a DVR of the same manufacture, the user would be unable to view the stored content. Thus the content stored in one DVR device is sort of non-transferrable and a user who may not able to share and/or play the content with any other device capable of playing content. Various features of the invention described herein remove such restrictions mentioned above while maintaining security on a per-asset and per-subscriber basis. Thus a subscriber may freely move the content stored on a DVR to another storage device that is associated with the subscriber and/or installed at the customer's premises where the DVR device is located.

In accordance with some embodiments, a secure Network-Attached Storage device (NAS) accepts video content initially recorded on a DVR device on a per-asset or per-event basis from the DVR. Thus various features of the present invention solve the problem of finite storage on a DVR device by offering one or more NAS devices as storage expansion. The recorded content can be automatically moved based on user's settings and/or need when storage space on the local DVR device becomes insufficient for recording new content. Some features facilitate securing content to a user rather than a device by linking security of the content to a user, and not the device.

It should be appreciated that moving content from one DVR device to another storage device is of particular interest to various multi system operators (MSOs). For example such a need arises when the operators and/or service providers wish to upgrade hardware or services in the field. Typically a lot of resources including both time and money are exhausted to preserve DVR content when software and/or hardware upgrades as well as service related upgrades are performed. Various features of the present invention, allows for the recorded DVR content to be secured to a user, allowing unrestricted movement of each asset, e.g., within that subscriber's home. Thus some features of the present invention resolve the device linkage of content by securing the content based on the user.

Some embodiments of the invention are well suited for implementation in a DLNA (Digital Living Network Alliance) ecosystem. An exemplary DVR device serves content to one or more DLNA clients, e.g., storage devices, as if it were a DLNA server. In some embodiments DLNA clients that offer storage are used to store recorded content transferred from the local DVR device via DLNA, and optionally DTLA (Digital transmission licensing administrator)-based security features are implemented. In various embodiments such a DLNA client is implemented as a network attached storage (NAS) device.

In accordance with one aspect of some embodiments, when during the course of operation, a DVR device reaches a storage threshold point where it can no longer record and store additional content, the DVR device will begins moving recorded content, on an asset-by-asset basis, to the NAS device, e.g., over a local network such as WiFi, Ethernet etc. In some embodiments, a policy, e.g., set of rules, for appropriate content to be moved and appropriate storage amounts to be vacated is implemented on the DVR device. The set of rules may be, and in some embodiments is, set by the user. Thus in some embodiments when the local DVR device reaches storage threshold, the DVR device securely moves the content from its internal storage to the NAS device over the home network.

In some embodiments, the DVR device is used as the location of the recording of a live asset. Thus, at least in some embodiments the NAS device is not expected to record an asset that the DVR device streams over the home network. In some embodiments for each show that the DVR device is to record (e.g., according to a recording schedule), the DVR device considers the predicted size of the recording and moves assets, e.g., one or more previously recorded items, from its internal storage to the NAS device as appropriate, e.g., based on a local storage priority associated with various recorded items and/or additional criteria.

One feature of some embodiments allows an exemplary DVR device implemented in accordance with the invention to move all assets to a NAS device, e.g., in the case where the DVR device needs upgrade, repair and/or needs to be replaced. In addition, in various embodiments the exemplary DVR device can move content from a NAS device back to the same DVR device and/or another DVR device located at the customer premise.

In some embodiments the NAS device also acts as a DLNA server, which enables it to stream the stored content to other DLNA clients, e.g., one or more storage devices, recording and/or playback devices. In some embodiments the DLNA clients receiving the content enforce the user-level authentication based on the security, e.g., encryption, applied to the content. Thus in some embodiments DLNA clients, including the DVR device, decrypt and display the content received from the NAS device.

In some embodiments the DVR device stores recorded content in a device-flexible DRM (digital rights management). In various embodiments device-flexible DRM refers to encryption of the content that can be decrypted by other devices with a properly generated DRM license file, e.g., which can be obtained by the devices from a security server such as security server 152 in the service provider's headend. In some embodiments where the DVR device stores the record content in its local storage, and protects the content locally with a device-flexible DRM, when the DVR storage threshold is met (e.g., the DVR device does not have sufficient storage to record the next program), the DVR device moves the content to the NAS device via DLNA without modification.

It should be appreciated that many DVR devices today locally store content with proprietary security mechanisms, rendering the stored content useless in other devices. In such cases where the DVR device includes recorded content that is protected using proprietary security mechanisms, when the DVR storage threshold is met, in accordance with some features of the invention the DVR device decrypts the content in a secure fashion, then re-encrypts in a device-flexible DRM. Such an operation of decrypting and then re-encrypting is sometimes referred to as a transcryption operation. Once the transcryption operation is complete, the DVR device moves the content which has been re-encrypted in accordance with device flexible DRM encryption to the NAS device.

In some embodiments where the DVR device is unable to transcrypt the content, or store the content locally in a device-flexible DRM, in accordance with one aspect of some embodiments the NAS device implements the optional DTLA portion of DLNA. Thus in such embodiments, once the DVR device storage threshold is met, the DVR device decrypts the content in a secure fashion, then re-encrypts in DTCP (digital transmission content protection), e.g., the content is encrypted in accordance with DTCP encryption mechanism. In some embodiments during the transcryption operation, the DVR device streams the content to the NAS device in real time. The NAS device then decrypts the DTCP-protected content received from the DVR device, and re-encrypts the content in a device-flexible DRM. In various embodiments, regardless of the DVR device storage and transcryption method, a device receiving the content from the NAS device is able to play the content moved from the NAS device only after the receiving device obtains an appropriate license for the moved content and its device-flexible DRM security, e.g., device-flexible DRM decryption key.

An exemplary method of operating a recording device including local storage in accordance with some embodiments comprises: receiving (e.g., from a user) a local storage priority indicator indicating a local storage priority of first content, e.g., movie, TV show etc., to be recorded; recording said first content on the local storage, said first content having a first local storage priority determined based on said user indicated local storage priority of first content; determining if previously recorded content should be moved from said local storage to a network storage device to increase space available on said local storage; and when it is determined that previously recorded content should be moved from said local storage to network storage device to increase space available on said local storage device, identifying content to be moved to the network storage device based on the local storage priority of individual pieces of content stored on said local storage.

In various embodiments, a lowest local storage priority indicator indicates that the user does not have a preference for local or network storage of content corresponding to the received local storage priority indicator. In some embodiments the local storage priority of the first content is indicated by a first local storage priority indicator value and a local storage priority of a second content stored on the local storage is indicated by a second local storage priority indicator value. In some embodiments when it is determined that previously recorded content should be moved from the local storage to the network storage device to increase space available on said local storage, the method further comprises: identifying previously recorded content to be moved from said local storage to said network storage device as a function of local storage priority indicator value associated with individual pieces of content stored on said local storage.

In some embodiments identifying previously recorded content to be moved from the local storage included in the recording device to the network storage device as a function of local storage priority indicator value associated with individual pieces of content stored on the local storage includes: identifying content having a lowest local storage priority from among the previously stored content on said local storage.

In some embodiments when there is more identified content having a lowest local storage priority than is necessary to transfer to achieve a desired amount of free space on said local storage, the recording device selects content to be moved as a function of the amount of time said content has been stored on said local storage. Thus if there is lot of data with a low local storage priority, in some embodiments the oldest data will be transferred first since older data is less likely to be requested than recently recorded data.

In some embodiments the method further includes: setting one or more recording timers, each recording timer indicating when a piece of content should be recorded. In some embodiments determining if previously recorded content should be moved from the local storage to the network storage device to increase space available on said local storage includes determining, prior to start of a recording time used to trigger recording of a particular piece of content, whether or not the local storage has sufficient available recording space to record said particular piece of content, and when it is determined that said local storage does not have sufficient available recording space to record said particular piece of content determining that previously recorded content in amount sufficient to free up enough local storage space to allow for recording of said particular piece of content should be moved from the local storage to the network storage device.

In some embodiments the method, further comprises: receiving information indicating a user desired period of time in which the first content should be available on the local storage; determining, prior to the start of said user desired period of time if the first content is stored locally or on said network storage; and transferring the first content from the network storage device to the local storage prior to the start of the desired period of time in response to determining that the first content is stored on said network storage device.

In some embodiments the method further comprises: treating the first content moved from the network storage device to the local storage for the user indicated period of time as having a highest local storage priority. In some embodiments treating the content moved from the network storage device to the local storage as having a highest local storage priority includes temporarily increasing the local storage priority of the first content to said highest priority if said content, moved from said network storage device to said local storage included in the recording device, has a lower local storage priority than said highest local storage priority.

In some embodiments the method further comprises: returning, at the end of the user desired period of time, the local storage priority of the first content to the local storage priority the first content had prior to the temporary increase. In some embodiments the method further comprises: deleting the transferred first content from the network storage device; and updating a set of stored information indicating the location of stored content to indicate that the transferred first content is stored on the local storage included in the recording device and is not stored on the network storage device.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system, content playback devices recording devices and/or storage devices. Various embodiments are also directed to methods, e.g., a method of operating a recording device and/or controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of operating a recording device, comprising:
receiving a local storage priority indicator indicating a user indicated local storage priority of first content;
recording said first content on a local storage included in said recording device, said first content having a first local storage priority determined based on said user indicated local storage priority of first content, said recording device being located at a customer premise;
determining if previously recorded content should be moved from said local storage to a network storage device to increase space available on said local storage included in the recording device; and
when it is determined that previously recorded content should be moved from said local storage to said network storage device to increase space available on said local storage, identifying content to be moved to said network storage device based on the local storage priority of individual pieces of content stored on said local storage, said identifying being based on a lowest local storage priority indicator associated with at least one piece of content that indicates that said user does not have a preference for local or network storage of content corresponding to said lowest local storage priority indicator;

moving the identified content to the network storage device; and recording content to be recorded on the local storage device.

2. The method of claim 1, wherein the first local storage priority of the first content is indicated by a first local storage priority indicator value and a local storage priority of a second content stored on said local storage is indicated by a second local storage priority indicator value; and when it is determined that previously recorded content should be moved from said local storage to said network storage device to increase space available on said local storage included in said recording device, the method further comprises:

identifying previously recorded content to be moved from said local storage to said network storage device as a function of local storage priority indicator value associated with individual pieces of content stored on said local storage.

3. The method of claim 2, wherein identifying previously recorded content to be moved from said local storage to said network storage device as a function of local storage priority indicator value associated with individual pieces of content stored on said local storage includes:

identifying content having a lowest local storage priority from among the previously stored content on said local storage.

4. The method of claim 3, wherein when there is more identified content having a lowest local storage priority than is necessary to transfer to achieve a desired amount of free space on said local storage, selecting content to be moved as a function of the amount of time said content has been stored on said local storage.

5. A method of operating a recording device, comprising:

receiving a local storage priority indicator indicating a user indicated local storage priority of first content;

recording said first content on a local storage included in said recording device, said first content having a first local storage priority determined based on said user indicated local storage priority of first content;

setting one or more recording timers, each recording timer indicating when a piece of content should be recorded;

wherein the first local storage priority of the first content is indicated by a first local storage priority indicator value and a local storage priority of a second content stored on said local storage is indicated by a second local storage priority indicator value;

determining if previously recorded content should be moved from said local storage to a network storage device to increase space available on said local storage included in the recording device, wherein determining if previously recorded content should be moved from said local storage in said recording device to the network storage device to increase space available on said local storage includes prior to start of a recording time used to trigger recording of a particular piece of content, determining whether or not the local storage included in said recording device has sufficient available recording space to record said particular piece of content; and when it is determined that said local storage does not have sufficient available recording space to record said particular piece of content: i) determining that previously recorded content in amount sufficient to free up enough local storage space to allow for recording of said particular piece of content should be moved from said local storage to the network storage device and ii) identifying content to be moved to said network storage device based on the local storage priority of individual pieces of content stored on said local storage.

6. A method of operating a recording device, comprising:

receiving a local storage priority indicator indicating a user indicated local storage priority of first content;

recording said first content on a local storage included in said recording device, said first content having a first local storage priority determined based on said user indicated local storage priority of first content;

determining if previously recorded content should be moved from said local storage to a network storage device to increase space available on said local storage included in the recording device; and when it is determined that previously recorded content should be moved from said local storage to said network storage device to increase space available on said local storage, identifying content to be moved to said network storage device based on the local storage priority of individual pieces of content stored on said local storage;

receiving information indicating a user desired period of time in which said first content should be available on said local storage included in said recording device;

determining, prior to the start of said user desired period of time if said first content is stored on said local storage or on said network storage device; and transferring said first content from said network storage device to said local storage in said recording device prior to the start of said desired period of time in response to determining that said first content is stored on said network storage device.

7. The method of claim 6, further comprising:

treating said first content moved from said network storage device to said local storage for said user desired period of time as having a highest local storage priority.

8. The method of claim 7, wherein treating said first content moved from said network storage device to said local storage device as having a highest local storage priority includes temporarily increasing the first local storage priority of said first content to said highest local storage priority if said first content moved from said network storage device to said local storage has a lower local storage priority than said highest local storage priority.

9. The method of claim 8, further comprising:

returning, at the end of said user desired period of time, said first local storage priority of said first content to a local storage priority that the first content had prior to said temporary increase.

10. The method of claim 8, further comprising:

deleting said transferred first content from said network storage device; and updating a set of stored information indicating the location of stored content to indicate that said transferred first content is stored on said local storage included in said recording device and is not stored on said network storage device.

11. A recording device, comprising:

local storage for storing content;

an interface configured to receive a local storage priority indicator indicating a user indicated local storage priority of first content;

a recording control module configured to record said first content on said local storage included in said recording device, said first content having a first local storage priority determined based on said user indicated local storage priority of first content; and a determination module configured to determine if previously recorded content should be moved from said local storage to a network storage device to increase space available on said local storage included in the recording device, and to identify content to be moved to said network storage device based on the local storage priority of individual pieces of content stored on said local storage when it is determined that previously recorded content should be moved from said local storage to said network storage device to increase space available on said local storage at least one of the pieces of content being associated with a lowest local storage priority indicator that indicates that said user does not have a preference for local or network storage of content corresponding to said lowest local storage priority indicator;

a content transfer control module configured to control moving, from the local storage to the network storage device, of previously recorded content that said determination module determines should be moved from said local storage to the network storage device; and wherein the recording control module is further configured to cause recording to said local storage device, of content to be recorded, after previously recorded content that said determination module determines should be moved from said local storage to the network storage device, has been moved to said network storage.

12. The recording device of claim 11,
wherein the first local storage priority of the first content is indicated by a first local storage priority indicator value and a local storage priority of a second content stored on said local storage is indicated by a second local storage priority indicator value; and wherein said determination module is further configured to identify previously recorded content to be moved from said local storage to said network storage device as a function of local storage priority indicator value associated with individual pieces of content stored on said local storage when it is determined that previously recorded content should be moved from said local storage to said network storage device to increase space available on said local storage.

13. The recording device of claim 12, wherein said determination module is further configured to identify content having a lowest local storage priority from among the previously stored content on said local storage, as part of identifying previously recorded content to be moved from said local storage to said network storage device as a function of local storage priority indicator value associated with individual pieces of content stored on said local storage.

14. The recording device of claim 13, wherein the determination module is further configured to select, when there is more identified content having a lowest local storage priority than is necessary to transfer to achieve a desired amount of free space on said local storage, content to be moved as a function of the amount of time said content has been stored on said local storage.

15. A recording device, comprising:
local storage for storing content;
an interface configured to receive a local storage priority indicator indicating a user indicated local storage priority of first content;
a recording control module configured to record said first content on said local storage included in said recording device, said first content having a first local storage priority determined based on said user indicated local storage priority of first content; and a determination module configured to determine if previously recorded content should be moved from said local storage to a network storage device to increase space available on said local storage included in the recording device, and to identify content to be moved to said network storage device based on the local storage priority of individual pieces of content stored on said local storage when it is determined that previously recorded content should be moved from said local storage to said network storage device to increase space available on said local storage; and a processor configured to set one or more recording timers, each recording timer indicating when a piece of content should be recorded;

wherein said determination module is further configured to
i) determine, prior to start of a recording time used to trigger recording of a particular piece of content, whether or not the local storage included in said recording device has sufficient available recording space to record said particular piece of content, and ii) determine that previously recorded content in amount sufficient to free up enough local storage space to allow for recording of said particular piece of content should be moved from said local storage to the network storage device when it is determined that said local storage does not have sufficient available recording space to record said particular piece of content.

16. A recording device, comprising:
local storage for storing content;
an interface configured to receive a local storage priority indicator indicating a user indicated local storage priority of first content;
a recording control module configured to record said first content on said local storage included in said recording device, said first content having a first local storage priority determined based on said user indicated local storage priority of first content; and a determination module configured to determine if previously recorded content should be moved from said local storage to a network storage device to increase space available on said local storage included in the recording device, and to identify content to be moved to said network storage device based on the local storage priority of individual pieces of content stored on said local storage when it is determined that previously recorded content should be moved from said local storage to said network storage device to increase space available on said local storage;

wherein said interface is further configured to receive information indicating a user desired period of time in which said first content should be available on said local storage included in said recording device;

wherein said determination module is further configured to determine, prior to the start of said user desired period of time, if said first content is stored on said local storage or on said network storage device; and wherein said recording device further includes a content transfer control module configured to transfer said first content from said network storage device to said local storage included in said recording device prior to the start of said desired period of time when it is determined that said first content is stored on said network storage device.

17. The recording device of claim 16, a processor configured to:
- temporarily increase the first local storage priority of said first content to a highest local storage priority if said first content moved from said network storage device to said local storage has a lower local storage priority than said highest local storage priority; and
- treat said first content moved from said network storage device to said local storage for said user desired period of time as having said highest local storage priority.

18. The recording device of claim 17, wherein said processor is further configured to:
- delete said transferred first content from said network storage device;

update a set of stored information indicating the location of stored content to indicate that said transferred first content is stored on said local storage included in said recording device and is not stored on said network storage device; and
- return, at the end of said user desired period of time, said first local storage priority of said first content to a local storage priority that the first content had prior to said temporary increase.

\* \* \* \* \*